US008072470B2

(12) United States Patent
Marks

(10) Patent No.: US 8,072,470 B2
(45) Date of Patent: Dec. 6, 2011

(54) SYSTEM AND METHOD FOR PROVIDING A REAL-TIME THREE-DIMENSIONAL INTERACTIVE ENVIRONMENT

(75) Inventor: Richard Marks, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 636 days.

(21) Appl. No.: 10/448,614

(22) Filed: May 29, 2003

(65) Prior Publication Data
US 2004/0239670 A1 Dec. 2, 2004

(51) Int. Cl.
*G06T 15/00* (2011.01)
(52) U.S. Cl. .......... 345/632; 345/473; 345/633; 463/32
(58) Field of Classification Search .................. 345/473, 345/158
See application file for complete search history.

(56) References Cited

U.S. PATENT DOCUMENTS

| | | | |
|---|---|---|---|
| 3,943,277 A | 3/1976 | Everly et al. .................... 348/19 |
| 4,263,504 A | 4/1981 | Thomas ........................ 235/454 |
| 4,313,227 A | 1/1982 | Eder ............................ 398/106 |
| 4,558,864 A | 12/1985 | Medwedeff ............... 273/148 B |
| 4,565,999 A | 1/1986 | King et al. .................... 345/158 |
| 4,787,051 A | 11/1988 | Olson .......................... 364/514 |
| 4,802,227 A | 1/1989 | Elko et al. ....................... 381/92 |
| 4,823,001 A | 4/1989 | Kobayashi et al. ........... 356/616 |
| 4,843,568 A | 6/1989 | Krueger et al. .............. 364/518 |
| 4,963,858 A | 10/1990 | Chien .......................... 340/710 |
| 5,034,986 A | 7/1991 | Karmann et al. ............ 382/103 |
| 5,055,840 A | 10/1991 | Bartlett .......................... 341/31 |
| 5,111,401 A | 5/1992 | Everett et al. .................. 701/24 |
| 5,128,671 A | 7/1992 | Thomas, Jr. .................... 341/20 |
| 5,144,594 A | 9/1992 | Gilchrist ....................... 367/129 |
| 5,195,179 A | 3/1993 | Tokunaga ..................... 395/161 |
| 5,260,556 A | 11/1993 | Lake et al. .................... 235/494 |
| 5,297,061 A | 3/1994 | Dementhon et al. .......... 345/180 |
| 5,335,011 A | 8/1994 | Addeo et al. .................... 348/15 |
| 5,394,168 A | 2/1995 | Smith, III et al. ............. 345/156 |
| 5,426,450 A | 6/1995 | Drumm ........................ 345/168 |
| 5,435,554 A | 7/1995 | Lipson ............................ 273/88 |

(Continued)

FOREIGN PATENT DOCUMENTS
EP 0 353 200 A2 1/1990
(Continued)

OTHER PUBLICATIONS

Kanade et al., A Stereo Machine for Video-rate Dense Depth Mapping and Its New Applications, 1996, CVPR 96, IEEE Computer Society Conference pp. 196-202.*

(Continued)

*Primary Examiner* — Ulka Chauhan
*Assistant Examiner* — Andrew G Yang
(74) *Attorney, Agent, or Firm* — Martine Penilla Group, LLP

(57) ABSTRACT

An invention is provided for affording a real-time three-dimensional interactive environment using a three-dimensional camera. The invention includes obtaining two-dimensional data values for a plurality of pixels representing a physical scene, and obtaining a depth value for each pixel of the plurality of pixels using a depth sensing device. Each depth value indicates a distance from a physical object in the physical scene to the depth sensing device. At least one computer-generated virtual object is inserted into the scene, and an interaction between a physical object in the scene and the virtual object is detected based on coordinates of the virtual object and the obtained depth values.

33 Claims, 10 Drawing Sheets

U.S. PATENT DOCUMENTS

| | | | |
|---|---|---|---|
| 5,453,758 A | 9/1995 | Sato | 345/158 |
| 5,455,685 A | 10/1995 | Mori | 348/363 |
| 5,473,701 A | 12/1995 | Cezanne et al. | 381/92 |
| 5,485,273 A | 1/1996 | Mark et al. | 356/350 |
| 5,517,333 A | 5/1996 | Tamura et al. | 358/158 |
| 5,528,265 A | 6/1996 | Harrison | 345/158 |
| 5,534,917 A | 7/1996 | MacDougall | 348/169 |
| 5,543,818 A | 8/1996 | Scott | 345/168 |
| 5,557,684 A | 9/1996 | Wang et al. | 382/107 |
| 5,563,988 A * | 10/1996 | Maes et al. | 345/421 |
| 5,568,928 A | 10/1996 | Munson et al. | 463/37 |
| 5,581,276 A | 12/1996 | Cipolla et al. | 345/156 |
| 5,583,478 A | 12/1996 | Renzi | 340/407.1 |
| 5,586,231 A | 12/1996 | Florent et al. | 345/472 |
| 5,611,000 A | 3/1997 | Szeliski et al. | 382/294 |
| 5,611,731 A | 3/1997 | Bouton et al. | 463/37 |
| 5,616,078 A | 4/1997 | Oh | 463/8 |
| 5,638,228 A | 6/1997 | Thomas, III | 360/60 |
| 5,649,021 A | 7/1997 | Matey et al. | 382/128 |
| 5,675,825 A | 10/1997 | Dreyer et al. | 395/800 |
| 5,675,828 A | 10/1997 | Stoel et al. | 395/825 |
| 5,677,710 A | 10/1997 | Thompson-Rohrlich | 345/173 |
| 5,706,364 A | 1/1998 | Kopec et al. | 382/159 |
| 5,768,415 A | 6/1998 | Jagadish et al. | 382/154 |
| 5,796,354 A | 8/1998 | Cartabiano et al. | 341/22 |
| 5,818,424 A | 10/1998 | Korth | 345/158 |
| 5,846,086 A | 12/1998 | Bizzi et al. | 434/247 |
| 5,850,222 A * | 12/1998 | Cone | 345/418 |
| 5,850,473 A | 12/1998 | Andersson | 382/165 |
| 5,861,910 A | 1/1999 | McGarry et al. | 348/87 |
| 5,870,100 A | 2/1999 | DeFreitas | 345/441 |
| 5,883,616 A | 3/1999 | Koizumi et al. | 345/156 |
| 5,889,672 A | 3/1999 | Schuler et al. | 700/83 |
| 5,900,863 A * | 5/1999 | Numazaki | 345/158 |
| 5,913,727 A * | 6/1999 | Ahdoot | 463/39 |
| 5,914,723 A | 6/1999 | Gajewska | 345/597 |
| 5,917,493 A | 6/1999 | Tan et al. | 715/835 |
| 5,917,936 A | 6/1999 | Katto | 382/154 |
| 5,923,306 A | 7/1999 | Smith et al. | 345/2 |
| 5,923,318 A | 7/1999 | Zhai et al. | 345/157 |
| 5,929,444 A | 7/1999 | Leichner | 250/341.7 |
| 5,930,383 A * | 7/1999 | Netzer | 382/154 |
| 5,930,741 A | 7/1999 | Kramer | 702/153 |
| 5,937,081 A | 8/1999 | O'Brill et al. | 382/111 |
| 5,959,596 A | 9/1999 | McCarten et al. | 345/2 |
| 5,963,250 A | 10/1999 | Parker et al. | 348/211.6 |
| 5,978,772 A | 11/1999 | Mold | 705/16 |
| 5,993,314 A | 11/1999 | Dannenberg et al. | 461/1 |
| 6,009,210 A * | 12/1999 | Kang | 382/276 |
| 6,014,167 A | 1/2000 | Suito et al. | 348/169 |
| 6,021,219 A | 2/2000 | Andersson et al. | 382/190 |
| 6,031,545 A | 2/2000 | Ellenby et al. | 345/435 |
| 6,031,934 A | 2/2000 | Ahmad et al. | 382/154 |
| 6,037,942 A | 3/2000 | Millington | 715/835 |
| 6,044,181 A | 3/2000 | Szeliski et al. | 382/284 |
| 6,049,619 A | 4/2000 | Anandan et al. | 382/107 |
| 6,056,640 A | 5/2000 | Schaaij | 463/4 |
| 6,057,909 A | 5/2000 | Yahav et al. | 356/5.04 |
| 6,061,055 A | 5/2000 | Marks | 382/276 |
| 6,072,494 A | 6/2000 | Nguyen | 715/863 |
| 6,075,895 A | 6/2000 | Qiao et al. | 382/218 |
| 6,091,905 A | 7/2000 | Yahav et al. | 396/106 |
| 6,094,625 A | 7/2000 | Ralston | 702/150 |
| 6,097,369 A | 8/2000 | Wambach | 345/158 |
| 6,100,517 A | 8/2000 | Yahav et al. | 250/208.1 |
| 6,100,895 A | 8/2000 | Miura et al. | 345/426 |
| 6,101,289 A | 8/2000 | Kellner | 382/276 |
| 6,115,052 A | 9/2000 | Freeman et al. | 345/473 |
| 6,134,346 A | 10/2000 | Berman et al. | 382/163 |
| 6,144,367 A | 11/2000 | Berstis | 345/158 |
| 6,151,009 A * | 11/2000 | Kanade et al. | 345/641 |
| 6,157,368 A | 12/2000 | Faeger | 345/156 |
| 6,160,540 A | 12/2000 | Fishkin et al. | 345/184 |
| 6,166,744 A | 12/2000 | Jaszlics et al. | 345/435 |
| 6,173,059 B1 | 1/2001 | Huang et al. | 381/92 |
| 6,175,343 B1 | 1/2001 | Mitchell et al. | 345/8 |
| 6,184,863 B1 | 2/2001 | Sibert et al. | 345/156 |
| 6,191,773 B1 | 2/2001 | Maruno et al. | 345/158 |
| 6,195,104 B1 | 2/2001 | Lyons | 345/473 |
| 6,215,898 B1 * | 4/2001 | Woodfill et al. | 382/154 |
| 6,243,074 B1 | 6/2001 | Fishkin et al. | 345/156 |
| 6,243,491 B1 | 6/2001 | Andersson | 382/165 |
| 6,275,213 B1 | 8/2001 | Tremblay et al. | 345/156 |
| 6,281,930 B1 | 8/2001 | Parker et al. | 348/211.9 |
| 6,282,362 B1 | 8/2001 | Murphy et al. | 386/46 |
| 6,295,064 B1 | 9/2001 | Yamaguchi | 345/419 |
| 6,297,838 B1 | 10/2001 | Chang et al. | 715/863 |
| 6,304,267 B1 | 10/2001 | Sata | 345/427 |
| 6,307,549 B1 | 10/2001 | King et al. | 715/810 |
| 6,307,568 B1 * | 10/2001 | Rom | 345/629 |
| 6,323,839 B1 | 11/2001 | Fukuda et al. | 345/157 |
| 6,323,942 B1 | 11/2001 | Bamji | 356/5.01 |
| 6,326,901 B1 | 12/2001 | Gonzales | 340/7.2 |
| 6,327,073 B1 | 12/2001 | Yahav et al. | 359/321 |
| 6,331,911 B1 | 12/2001 | Manassen et al. | 359/260 |
| 6,346,929 B1 | 2/2002 | Fukushima et al. | 354/8 |
| 6,351,661 B1 | 2/2002 | Cosman | 600/426 |
| 6,371,849 B1 | 4/2002 | Togami | 463/4 |
| 6,375,572 B1 | 4/2002 | Masuyama et al. | 463/43 |
| 6,392,644 B1 | 5/2002 | Miyata et al. | 345/419 |
| 6,393,142 B1 | 5/2002 | Swain et al. | 382/154 |
| 6,394,897 B1 | 5/2002 | Togami | 463/4 |
| 6,400,374 B2 | 6/2002 | Lanier | 345/630 |
| 6,409,602 B1 | 6/2002 | Wiltshire et al. | 463/42 |
| 6,411,392 B1 | 6/2002 | Bender et al. | 358/1.14 |
| 6,411,744 B1 | 6/2002 | Edwards | 382/294 |
| 6,417,836 B1 | 7/2002 | Kumar et al. | 345/156 |
| 6,441,825 B1 | 8/2002 | Peters | 345/473 |
| 6,473,516 B1 | 10/2002 | Kawaguchi et al. | 382/100 |
| 6,498,860 B1 | 12/2002 | Sasaki et al. | 382/103 |
| 6,504,535 B1 | 1/2003 | Edmark | 345/419 |
| 6,513,160 B2 | 1/2003 | Dureau | 725/9 |
| 6,516,466 B1 | 2/2003 | Jackson | 725/62 |
| 6,519,359 B1 * | 2/2003 | Nafis et al. | 382/154 |
| 6,533,420 B1 | 3/2003 | Eichenlaub | 353/7 |
| 6,542,927 B2 | 4/2003 | Rhoads | 709/217 |
| 6,545,706 B1 | 4/2003 | Edwards et al. | 348/169 |
| 6,546,153 B1 | 4/2003 | Hoydal | 382/285 |
| 6,556,704 B1 | 4/2003 | Chen | 382/154 |
| 6,577,748 B2 | 6/2003 | Chang | 382/100 |
| 6,580,414 B1 | 6/2003 | Wergen et al. | 345/156 |
| 6,580,415 B1 | 6/2003 | Kato et al. | 345/156 |
| 6,587,573 B1 | 7/2003 | Stam et al. | 382/104 |
| 6,587,835 B1 | 7/2003 | Treyz et al. | 705/14 |
| 6,593,956 B1 | 7/2003 | Potts et al. | 348/14.09 |
| 6,595,642 B2 | 7/2003 | Wirth | 351/211 |
| 6,621,938 B1 | 9/2003 | Tanaka et al. | 382/276 |
| 6,628,265 B2 | 9/2003 | Hwang | 345/156 |
| 6,674,415 B2 | 1/2004 | Nakamura et al. | 345/32 |
| 6,676,522 B2 | 1/2004 | Rowe et al. | 463/42 |
| 6,677,967 B2 | 1/2004 | Swano et al. | 715/839 |
| 6,677,987 B1 | 1/2004 | Girod | 348/171 |
| 6,709,108 B2 | 3/2004 | Levine et al. | 351/211 |
| 6,712,703 B2 | 3/2004 | Miyamoto et al. | 463/43 |
| 6,720,949 B1 | 4/2004 | Pryor et al. | 345/158 |
| 6,727,988 B2 | 4/2004 | Kim et al. | 356/319 |
| 6,741,741 B2 | 5/2004 | Farrell | 382/199 |
| 6,746,124 B2 | 6/2004 | Fischer et al. | 353/43 |
| 6,749,510 B2 | 6/2004 | Giobbi | 463/42 |
| 6,751,338 B1 * | 6/2004 | Wallack | 382/106 |
| 6,753,849 B1 | 6/2004 | Curran et al. | 345/158 |
| 6,767,282 B2 | 7/2004 | Matsuyama et al. | 463/3 |
| 6,769,769 B2 | 8/2004 | Podlleanu et al. | 351/221 |
| 6,772,057 B2 | 8/2004 | Breed et al. | 701/45 |
| 6,774,939 B1 | 8/2004 | Peng | 348/231.4 |
| 6,785,329 B1 | 8/2004 | Pan et al. | 375/240.08 |
| 6,789,967 B1 | 9/2004 | Forester | 400/489 |
| 6,791,531 B1 | 9/2004 | Johnston et al. | 345/157 |
| 6,795,068 B1 | 9/2004 | Marks | 345/419 |
| 6,809,776 B1 | 10/2004 | Simpson et al. | 348/565 |
| 6,819,318 B1 * | 11/2004 | Geng | 345/420 |
| 6,846,238 B2 | 1/2005 | Wells | 463/39 |
| 6,847,311 B2 | 1/2005 | Li | 341/28 |
| 6,863,609 B2 | 3/2005 | Okuda et al. | 463/36 |
| 6,870,526 B2 | 3/2005 | Zngf et al. | 345/185 |
| 6,873,747 B2 * | 3/2005 | Askary | 382/295 |
| 6,881,147 B2 | 4/2005 | Naghi et al. | 463/35 |

| Patent No. | Date | Inventor | Class |
|---|---|---|---|
| 6,884,171 B2 | 4/2005 | Eck et al. | 463/42 |
| 6,890,262 B2 | 5/2005 | Oishi et al. | 463/31 |
| 6,917,688 B2 | 7/2005 | Yu et al. | 381/94.7 |
| 6,919,824 B2 | 7/2005 | Lee | 341/20 |
| 6,924,787 B2 | 8/2005 | Kramer et al. | 345/156 |
| 6,928,180 B2 | 8/2005 | Stam et al. | 382/104 |
| 6,930,725 B1 | 8/2005 | Hayashi | 345/373 |
| 6,931,125 B2 | 8/2005 | Smallwood | 379/433.07 |
| 6,931,596 B2 | 8/2005 | Gutta et al. | 715/728 |
| 6,943,776 B2 | 9/2005 | Ehrenburg | 345/168 |
| 6,945,653 B2 | 9/2005 | Kobori et al. | 353/30 |
| 6,947,576 B2 | 9/2005 | Stam et al. | 382/104 |
| 6,952,198 B2 | 10/2005 | Hansen | 345/158 |
| 6,965,362 B1 | 11/2005 | Ishizuka | 345/82 |
| 6,970,183 B1 | 11/2005 | Monroe | 348/143 |
| 6,990,639 B2 | 1/2006 | Wilson | 715/863 |
| 7,006,009 B2 | 2/2006 | Newman | 340/854.5 |
| 7,016,411 B2 | 3/2006 | Azuma et al. | 375/240.08 |
| 7,016,532 B2 | 3/2006 | Boncyk et al. | 382/165 |
| 7,023,475 B2 | 4/2006 | Bean et al. | 348/207.99 |
| 7,039,199 B2 | 5/2006 | Rui | 381/92 |
| 7,039,253 B2 | 5/2006 | Matsuoka et al. | 382/295 |
| 7,042,440 B2 | 5/2006 | Pryor et al. | 345/158 |
| 7,043,056 B2 | 5/2006 | Edwards et al. | 382/103 |
| 7,054,452 B2 | 5/2006 | Ukita | 381/92 |
| 7,059,962 B2 | 6/2006 | Watashiba | 463/2 |
| 7,061,507 B1 | 6/2006 | Tuomi et al. | 345/611 |
| 7,071,914 B1 | 7/2006 | Marks | 345/156 |
| 7,084,887 B1 | 8/2006 | Sato et al. | 345/633 |
| 7,090,352 B2 | 8/2006 | Kobor et al. | 353/30 |
| 7,098,891 B1 | 8/2006 | Pryor | 345/158 |
| 7,102,615 B2 | 9/2006 | Marks | 345/156 |
| 7,106,366 B2 | 9/2006 | Parker et al. | 348/222.1 |
| 7,113,635 B2 * | 9/2006 | Robert et al. | 382/154 |
| 7,116,330 B2 | 10/2006 | Marshall et al. | 345/474 |
| 7,116,342 B2 | 10/2006 | Dengler et al. | 345/630 |
| 7,121,946 B2 | 10/2006 | Paul et al. | 463/36 |
| 7,139,767 B1 | 11/2006 | Taylor et al. | 707/102 |
| 7,148,922 B2 | 12/2006 | Shimada | 348/370 |
| 7,156,311 B2 | 1/2007 | Attia et al. | 235/462.46 |
| 7,158,118 B2 | 1/2007 | Liberty | 345/158 |
| 7,161,634 B2 | 1/2007 | Long | 384/624 |
| 7,164,413 B2 | 1/2007 | Davis et al. | 345/163 |
| 7,174,312 B2 | 2/2007 | Harper et al. | 705/35 |
| 7,183,929 B1 | 2/2007 | Antebi et al. | 340/573.1 |
| 7,212,308 B2 | 5/2007 | Morgan | 358/1.18 |
| 7,223,173 B2 | 5/2007 | Masuyama et al. | 463/36 |
| 7,224,384 B1 | 5/2007 | Iddan et al. | 348/207.99 |
| 7,227,526 B2 * | 6/2007 | Hildreth et al. | 345/156 |
| 7,227,976 B1 | 6/2007 | Jung et al. | 382/103 |
| 7,239,301 B2 | 7/2007 | Liberty et al. | 345/158 |
| 7,245,273 B2 | 7/2007 | Eberl et al. | 351/211 |
| 7,259,375 B2 | 8/2007 | Tichit et al. | 250/341.8 |
| 7,262,760 B2 | 8/2007 | Liberty | 345/158 |
| 7,263,462 B2 | 8/2007 | Funge et al. | 702/179 |
| 7,274,305 B1 | 9/2007 | Luttrell | 340/870.02 |
| 7,283,679 B2 | 10/2007 | Okada et al. | 382/260 |
| 7,296,007 B1 | 11/2007 | Funge et al. | 706/47 |
| 7,301,530 B2 | 11/2007 | Lee et al. | 345/158 |
| 7,301,547 B2 * | 11/2007 | Martins et al. | 345/633 |
| 7,305,114 B2 | 12/2007 | Wolff et al. | 709/200 |
| 7,346,387 B1 | 3/2008 | Wachter et al. | 600/476 |
| 7,352,359 B2 | 4/2008 | Zalewski et al. | 345/156 |
| 7,364,297 B2 | 4/2008 | Goldfain et al. | 351/206 |
| 7,379,559 B2 * | 5/2008 | Wallace et al. | 382/100 |
| 7,391,409 B2 | 6/2008 | Zalewski et al. | 345/156 |
| 7,414,611 B2 | 8/2008 | Liberty | 345/158 |
| 7,436,887 B2 | 10/2008 | Yeredor et al. | 375/240 |
| 7,446,650 B2 | 11/2008 | Schofield et al. | 340/425.5 |
| 7,489,298 B2 | 2/2009 | Liberty | 345/158 |
| 7,489,299 B2 | 2/2009 | Liberty et al. | 345/163 |
| 7,545,926 B2 | 6/2009 | Mao | 379/406.08 |
| 7,555,157 B2 * | 6/2009 | Davidson et al. | 382/154 |
| 7,558,698 B2 | 7/2009 | Funge et al. | 702/179 |
| 7,613,610 B1 | 11/2009 | Zimmerman et al. | 704/235 |
| 7,623,115 B2 | 11/2009 | Marks | 345/156 |
| 7,627,139 B2 | 12/2009 | Marks et al. | 382/103 |
| 7,636,645 B1 | 12/2009 | Yen et al. | 702/152 |
| 7,636,697 B1 | 12/2009 | Dobson et al. | 706/12 |
| 7,636,701 B2 | 12/2009 | Funge et al. | 706/47 |
| 7,646,372 B2 | 1/2010 | Marks et al. | 345/156 |
| 7,665,041 B2 | 2/2010 | Wilson et al. | 715/860 |
| 7,697,700 B2 | 4/2010 | Mao | 381/94.3 |
| 7,721,231 B2 | 5/2010 | Wilson | 715/863 |
| 2001/0056477 A1 | 12/2001 | McTernan et al. | 709/219 |
| 2002/0010655 A1 | 1/2002 | Kjallstrom | 705/27 |
| 2002/0023027 A1 | 2/2002 | Simonds | 705/26 |
| 2002/0036617 A1 | 3/2002 | Pryor | 345/156 |
| 2002/0041327 A1 | 4/2002 | Hildreth et al. | 348/42 |
| 2002/0056114 A1 | 5/2002 | Fillebrown et al. | 725/78 |
| 2002/0072414 A1 | 6/2002 | Stylinski et al. | 463/42 |
| 2002/0075286 A1 | 6/2002 | Yonezawa et al. | 345/679 |
| 2002/0083461 A1 | 6/2002 | Hutcheson et al. | 725/62 |
| 2002/0085097 A1 | 7/2002 | Colmenarez et al. | 348/211 |
| 2002/0094189 A1 | 7/2002 | Navab et al. | 386/4 |
| 2002/0110273 A1 | 8/2002 | Dufour | 382/154 |
| 2002/0126899 A1 | 9/2002 | Farrell | 382/199 |
| 2002/0134151 A1 * | 9/2002 | Naruoka et al. | 73/291 |
| 2002/0158873 A1 * | 10/2002 | Williamson | 345/427 |
| 2003/0014212 A1 | 1/2003 | Ralston et al. | 702/150 |
| 2003/0020718 A1 | 1/2003 | Marshall et al. | |
| 2003/0022716 A1 | 1/2003 | Park et al. | 463/36 |
| 2003/0032466 A1 | 2/2003 | Watashiba | |
| 2003/0032484 A1 | 2/2003 | Ohshima et al. | 463/43 |
| 2003/0093591 A1 | 5/2003 | Hohl | 710/22 |
| 2003/0100363 A1 | 5/2003 | Ali | 436/30 |
| 2003/0123705 A1 | 7/2003 | Stam et al. | 382/104 |
| 2003/0160862 A1 | 8/2003 | Charlier et al. | 348/14.08 |
| 2003/0232649 A1 | 12/2003 | Gizis et al. | 463/40 |
| 2004/0001082 A1 | 1/2004 | Said | 345/730 |
| 2004/0017355 A1 | 1/2004 | Shim | 345/157 |
| 2004/0035925 A1 | 2/2004 | Wu et al. | 235/380 |
| 2004/0054512 A1 | 3/2004 | Kim et al. | 703/8 |
| 2004/0063480 A1 | 4/2004 | Wang | 463/8 |
| 2004/0063481 A1 | 4/2004 | Wang | 463/8 |
| 2004/0070565 A1 | 4/2004 | Nayar et al. | 345/156 |
| 2004/0087366 A1 | 5/2004 | Shum et al. | 463/36 |
| 2004/0095327 A1 | 5/2004 | Lo | 345/169 |
| 2004/0140955 A1 | 7/2004 | Metz | 345/166 |
| 2004/0150728 A1 | 8/2004 | Ogino | 348/239 |
| 2004/0178576 A1 | 9/2004 | Hillis et al. | 273/148 |
| 2004/0189720 A1 * | 9/2004 | Wilson et al. | 345/863 |
| 2004/0212589 A1 | 10/2004 | Hall et al. | 345/156 |
| 2004/0213419 A1 | 10/2004 | Varma et al. | 381/92 |
| 2004/0227725 A1 | 11/2004 | Calarco et al. | 345/156 |
| 2004/0254017 A1 | 12/2004 | Cheng | 463/35 |
| 2005/0037844 A1 | 2/2005 | Shum et al. | 463/36 |
| 2005/0047611 A1 | 3/2005 | Mao | 381/94.7 |
| 2005/0088369 A1 | 4/2005 | Yoshioka | 345/60 |
| 2005/0102374 A1 | 5/2005 | Moragne et al. | 709/217 |
| 2005/0105777 A1 | 5/2005 | Koslowski et al. | 382/115 |
| 2005/0117045 A1 | 6/2005 | Abdellatif et al. | 384/335 |
| 2005/0162384 A1 | 7/2005 | Ykoyama | 345/156 |
| 2005/0198095 A1 | 9/2005 | Du et al. | 709/200 |
| 2005/0226431 A1 | 10/2005 | Mao | 381/61 |
| 2005/0239548 A1 | 10/2005 | Ueshima et al. | 463/36 |
| 2006/0033713 A1 | 2/2006 | Pryor | 345/158 |
| 2006/0035710 A1 | 2/2006 | Festejo et al. | 463/36 |
| 2006/0038819 A1 | 2/2006 | Festejo et al. | 345/530 |
| 2006/0204012 A1 | 9/2006 | Marks et al. | 381/26 |
| 2006/0233389 A1 | 10/2006 | Mao et al. | 381/92 |
| 2006/0252541 A1 | 11/2006 | Zalewski et al. | 463/156 |
| 2006/0252543 A1 | 11/2006 | Van Noland et al. | 463/37 |
| 2006/0256081 A1 | 11/2006 | Zalewski et al. | 345/156 |
| 2006/0264258 A1 | 11/2006 | Zalewski et al. | 463/36 |
| 2006/0264259 A1 | 11/2006 | Zalewski et al. | 463/36 |
| 2006/0264260 A1 | 11/2006 | Zalewski et al. | 463/36 |
| 2006/0269072 A1 | 11/2006 | Mao | 381/56 |
| 2006/0269073 A1 | 11/2006 | Mao | 381/56 |
| 2006/0274032 A1 | 12/2006 | Mao et al. | 345/156 |
| 2006/0274911 A1 | 12/2006 | Mao et al. | 381/334 |
| 2006/0280312 A1 | 12/2006 | Mao | 381/56 |
| 2006/0282873 A1 | 12/2006 | Zalewski et al. | 725/133 |
| 2006/0287084 A1 | 12/2006 | Mao et al. | 463/37 |
| 2006/0287085 A1 | 12/2006 | Mao et al. | 463/37 |
| 2006/0287086 A1 | 12/2006 | Zalewski et al. | 436/37 |
| 2006/0287087 A1 | 12/2006 | Zalewski et al. | 463/37 |
| 2007/0015559 A1 | 1/2007 | Zalewski et al. | 463/1 |

| | | |
|---|---|---|
| 2007/0021208 A1 | 1/2007 | Mao et al. ............. 463/36 |
| 2007/0025562 A1 | 2/2007 | Zalewski et al. ........ 381/92 |
| 2007/0061413 A1 | 3/2007 | Larsen et al. .......... 709/217 |
| 2007/0066394 A1 | 3/2007 | Ikeda et al. ............ 463/37 |
| 2007/0072675 A1 | 3/2007 | Hammano et al. ....... 463/42 |
| 2007/0120834 A1 | 5/2007 | Boillot .................. 354/103 |
| 2007/0120996 A1 | 5/2007 | Boillot .................. 384/345 |
| 2007/0260340 A1 | 11/2007 | Mao ....................... 700/94 |
| 2007/0260517 A1 | 11/2007 | Zalewski et al. ........ 705/14 |
| 2007/0261077 A1 | 11/2007 | Zalewski et al. ........ 725/35 |
| 2008/0056561 A1 | 3/2008 | Sawachi ................ 382/154 |
| 2008/0070684 A1 | 3/2008 | Haigh-Hutchinson ... 463/32 |
| 2008/0091421 A1 | 4/2008 | Gustavsson ............ 704/233 |
| 2008/0208613 A1 | 8/2008 | Scibora ................... 705/1 |
| 2009/0010494 A1 | 1/2009 | Bechtel et al. ......... 382/104 |
| 2009/0016642 A1 | 1/2009 | Hart ...................... 382/278 |
| 2009/0221368 A1 | 9/2009 | Yen et al. ............... 463/32 |
| 2009/0221374 A1 | 9/2009 | Yen et al. ............... 463/42 |
| 2009/0288064 A1 | 11/2009 | Yen et al. .............. 717/106 |
| 2010/0004896 A1 | 1/2010 | Yen et al. .............. 702/153 |
| 2010/0137064 A1 | 6/2010 | Shum et al. ............ 463/36 |

FOREIGN PATENT DOCUMENTS

| | | |
|---|---|---|
| EP | 0353200 | 1/1990 |
| EP | 0 613 294 A1 | 8/1994 |
| EP | 0652686 | 5/1995 |
| EP | 0 750 202 A1 | 12/1996 |
| EP | 0750202 | 12/1996 |
| EP | 0 823 683 A1 | 2/1998 |
| EP | 0835676 | 4/1998 |
| EP | 1098686 | 5/2003 |
| EP | 1435258 | 7/2004 |
| FR | 2 832 892 | 5/2003 |
| GB | 2206716 | 11/1989 |
| GB | 2376397 | 11/2002 |
| GB | 2 376 397 A | 12/2002 |
| GB | 2388418 | 11/2003 |
| JP | 1284897 | 11/1989 |
| JP | 6102980 | 4/1994 |
| JP | 9128141 | 5/1997 |
| JP | 9185456 | 7/1997 |
| JP | 1138949 | 2/1999 |
| JP | 2000-172431 | 6/2000 |
| JP | 2000172431 | 6/2000 |
| JP | 2000259856 | 9/2000 |
| JP | 2000350859 | 12/2000 |
| JP | 2001-166676 | 6/2001 |
| JP | 2002369969 | 12/2002 |
| JP | 2004-145448 | 5/2004 |
| WO | WO 88/05942 | 8/1988 |
| WO | WO 98/48571 | 10/1998 |
| WO | WO 99/26198 | 5/1999 |
| WO | WO 99/35633 | 7/1999 |
| WO | WO 01/18563 A1 | 3/2001 |
| WO | WO 02/27456 | 2/2002 |
| WO | WO 03/079179 | 9/2003 |
| WO | WO 2005/073838 | 8/2005 |
| WO | WO 2008/056180 | 5/2008 |

OTHER PUBLICATIONS

D'Hooge et al., "Game Design Principles for the Intel Play Me2Cam Virtual Game System," 2001, Intel Technology Journal, pp. 1-9.*

"Reality Fusion GameCam Lets Players Get Inside the Game". Business Wire. FindArticles.com. retrieved Jul. 12, 2010. http://findarticles.com/p/articles/mi_m0EIN/is_1999_Oct_1/ai_55932662/.*

Klinker et al., "Distributed User Tracking Concepts for Augmented Reality Applications", pp. 37-44, Augmented Reality, 2000, IEEE and ACM Int'l Symposium, Oct. 2000, XP010520308, ISBN: 0-7695-0846-4, Germany.

"The Tracking Cube: A Three-Dimensional Input Device," IBM Technical Disclosure Bulletin, Aug. 1, 1989, p. 91-95, vol. 32, No. 3B, IBM Corp. New York, US.

Iddan et al. "3D Imaging in the Studio (And Elsewhere . . . )", Proceedings of the SPIE, SPIE, Bellingham, VA, US, vol. 4298, Jan. 24, 2001, pp. 48-55, XP008005351.

Jojie et al. "Tracking Self-Occluding Articulated Objects in Dense Disparity Maps", Computer Vision, 1999. The Proceedings of the Seventh IEEE International Conference on Kerkyra, Greece Sep. 20-27, 1999, Los Alamitos, CA, USA, IEEE Comput. Soc, US, Sep. 20, 1999, pp. 123-130.

Nakagawa et al., "A Collision Detection and Motion Image Synthesis Between a Background Image and a Foreground 3-Dimensional Object", TVRSJ vol. 4, No. 2, pp. 425-430, 1999, Japan.

Mihara et al., "A Realtime Vision-Based Interface Using Motion Processor and Applications to Robotics", vol. J84-D-11, No. 9, pp. 2070-2078, Sep. 2001, Japan.

Nakamura et al., "A Consideration on Reconstructing 3-D Model Using Object Views", 2004-01601-003, pp. 17-21, Kokkaido University, Japan, nakamura@media.eng.hokudai.ac.jp.

Nishida et al., "A Method of Estimating Human Shapes by Fitting the Standard Human Model to Partial Measured Data", D-II vol. J84-D-II, No. 7, pp. 1310-1318, Jul. 2001, Japan.

K. B. Shimoga, et al., "Touch and Force Reflection for Telepresence Surgery", Engineering in Medicine and Biology Opportunities of the IEEEE, Baltimore, MD, USA, Nov. 3, 1994, New York, New York, USA, pp. 1049-1050.

Wilson & Darrell, "Audio-Video Array Source Localization for Intelligent Environments", 2002 IEEE Dept. of Electrical Eng and Computer Science, MIT, Cambridge, MA 02139.

Fiala, et al., "A Panoramic Video and Acoustic Beamforming Sensor for Videoconferencing", 2004 IEEE, Computational Video Group, National Research Council, Ottawa, Canada K1A OR6.

Hemmi, et al., "3-D Natural Interactive Interface—Using Marker Tracking from a Single View",Sep. 9, 1991, Systems and Computers in Japan.

Gvili, et al., "Depth Keying", SPIE vol. 5006 (2003), 2003 SPIE-IS &T, pp. 564-574 (031).

Richardson et al., "Virtual Network Computing" IEEE Internet Computing, vol. 2,No. 1 Jan./Feb. 1998.

Fujitsu, "Internet Development of Emulators" Abstract, Mar. 1997, vol. 48, No. 2.

Lanier, Jaron, "Virtually there: three-dimensional tele-immersion may eventually bring the world to your desk", Scientific American, ISSN: 0036-8733, Year: 2001.

Ephraim et al. "Speech Enhancement Using a Minimum Mean-Square Error Log-Spectral Amplitude Estimator", 1985, IEEE.

Ephraim et al. "Speech Enhancement Using a Minimum Mean-Square Error Short-Time Spectral Amplitude Estimator", 1984, IEEE.

Richardson et al. "Virtual Network Computing", 1998, IEEE Internet Computing vol. 2.

XP-002453974, "CFS and FS95/98/2000: How to Use the Trim Controls to Keep Your Aircraft Level", Aug. 10, 2007, http://support.microsoft.com/?scid=kb%3Ben-us%3B175195&x=13&y=15.

Bolt, R.A., "Put-that-there": voice and gesture at the graphics interface,Computer Graphics, vol. 14, No. 3 (ACM SIGGRAPH Conference Proceedings) Jul. 1980, pp. 262-270.

DeWitt, Thomas and Edelstein, Phil "Pantomation: A System for Position Tracking", Proceedings of the $2^{nd}$ Symposium on Small Computers in the Arts, Oct. 1982, pp. 61-69.

* cited by examiner

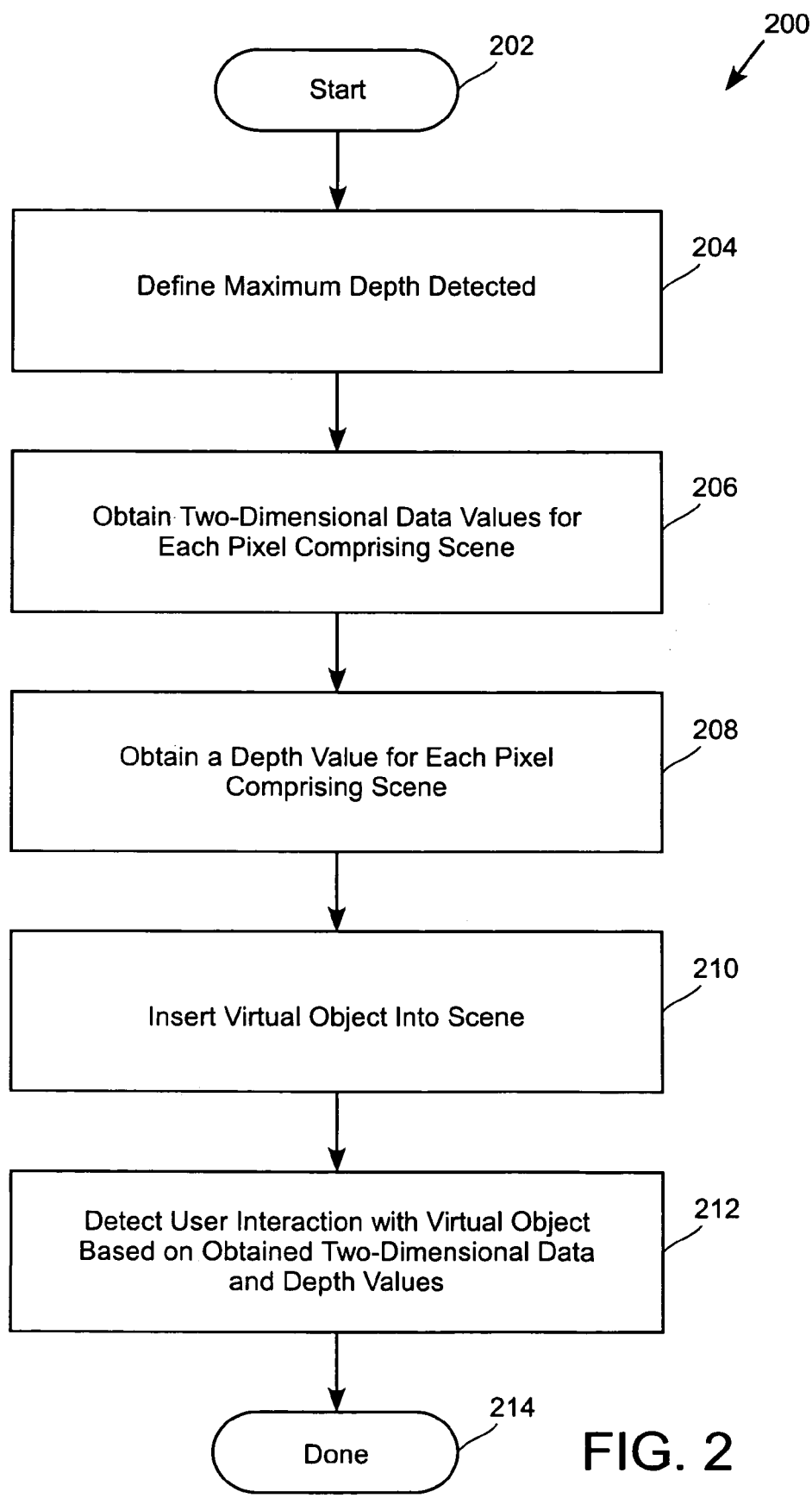

SYSTEM AND METHOD FOR PROVIDING A REAL-TIME THREE-DIMENSIONAL INTERACTIVE ENVIRONMENT

CROSS REFERENCE TO RELATED APPLICATIONS

This application is related to U.S. patent application Ser. No. 10/365,120, filed Feb. 11, 2003, and entitled "Method and Apparatus for Real-Time Motion Capture," which is incorporated herein be reference.

BACKGROUND OF THE INVENTION

1. Field of the Invention

This invention relates generally to video image processing, and more particularly to providing a real-time interactive computer environment using a three-dimensional camera.

2. Description of the Related Art

With the increased processing capabilities of today's computer technology, new creative methods for interacting with computer systems have become available. For example, new on-line keyboards allow individuals to enter information without the need for a physical keyboard, and new game controllers with a plurality of joysticks and directional keys enhance the user's ability to interact with the computer system. In addition to hand held input devices, input devices employing video images are currently available that allow user control of objects on a graphical display such as a video monitor.

Such video input devices often are responsive to the movement or position of a user in the field of view of a video capture device. More recently, video image processing has been used to translate the movement of the user that has been captured as a sequence of video images into signals for game control. Prior art input systems include a video capture device that scans a field of view in which a system user stands. The captured video image is applied to a video digitizer that provides digital output to a processor that analyzes and processes the digital information received from the digitizer.

Based upon the position or movement of the participant in the field of view, the processor produces signals that are used by the graphics generating system to move objects on the display. Although the operation or output of the devices or graphical displays can thereby be affected by the position or movement of the participant, the computer processing time required is frequently very extensive and complex, tending to require substantial computer and/or time resources.

In addition, known devices and methods employing user video image data that are used to affect the movement of an object on a graphical display are typically characterized by significant encumbrances upon the participant within the video camera field of view. Such systems may include additional equipment that the participant is required to wear, such as arm coverings or gloves with integral, more easily detectable portions or colors, and/or visible light sources such as light emitting diodes. Unfortunately, such systems do not allow for the ease-of-use, quick response, and simplicity needed to provide a user input device capable of meeting marketability requirements for consumer items such as might be required of video game controllers.

In view of the foregoing, there is a need for enhanced systems and methods that allow interaction in a three-dimensional environment. The methods should allow user interaction without requiring additional equipment, such as arm coverings or gloves. In addition, the method should not require overly burdensome processing ability and should have the ability to function in real-time, thus providing the user with a natural computer interaction experience.

SUMMARY OF THE INVENTION

Broadly speaking, embodiments of the present invention fill these needs by providing a real-time three-dimensional interactive environment using a three-dimensional camera. Generally, embodiments of the present invention allow the user to interact with, and affect, computer-generated objects and environments that are combined visually with the user's actual physical environment. In one embodiment, a method is disclosed for providing a real-time three-dimensional interactive environment. The method includes obtaining two-dimensional data values for a plurality of pixels representing a physical scene, and obtaining a depth value for each pixel of the plurality of pixels using a depth sensing device. Each depth value indicates a distance from a physical object in the physical scene to the depth sensing device. At least one computer-generated virtual object is inserted into the scene, and an interaction between a physical object in the scene and the virtual object is detected based on coordinates of the virtual object and the obtained depth values. For example, the two-dimensional values for the plurality of pixels can be color values, and each depth value can indicate a distance from a physical object in the physical scene represented by the corresponding pixel to the sensing device. In one aspect, the interaction can be a collision between a physical object in the scene and the virtual object. In this aspect, the collision is detected when the virtual object and a physical object occupy a same three-dimensional space based on three-dimensional coordinates of the virtual object and three-dimensional coordinates of the physical object. Optionally, an appearance of a physical object in the scene can be visually altered. For example, the physical object can be a user, and computer-generated clothing can be mapped to the user based on the depth values for pixels representing the user. In addition, a maximum depth range can be defined that indicates the farthest distance for which depth values will be obtained. In this aspect, depth values for the user may be detected only when the user is within a distance less than the maximum depth range to the sensing device.

A computer program embodied on a computer readable medium for providing a real-time three-dimensional interactive environment is disclosed in an additional embodiment of the present invention. The computer program includes program instructions that obtain two-dimensional data values for a plurality of pixels representing a physical scene. Also, program instructions are included that obtain a depth value for each pixel of the plurality of pixels using a depth sensing device. As above, each depth value indicates a distance from a physical object in the physical scene to the depth sensing device. Program instructions also are included that insert at least one virtual object into the scene, the virtual object being computer-generated. Further, program instructions are included that detect an interaction between a physical object in the scene and the virtual object based on coordinates of the virtual object and the obtained depth values. As above, the two-dimensional values for the plurality of pixels are color values, and each depth value can indicate a distance from a physical object in the physical scene represented by the corresponding pixel to the sensing device. Optionally, program instructions can be included that define a maximum depth range that indicates the farthest distance for which depth values will be obtained.

In a further embodiment, a system is disclosed for providing a real-time three-dimensional interactive environment.

The system includes a depth sensing device capable of obtaining two-dimensional data values for a plurality of pixels representing a physical scene. The depth sensing device is further capable of obtaining a depth value for each pixel of the plurality of pixels. As above, each depth value indicates a distance from a physical object in the physical scene to the depth sensing device. Also included in the system is logic that inserts at least one computer-generated virtual object into the scene. Further, the system includes logic that detects an interaction between a physical object in the scene and the virtual object based on coordinates of the virtual object and the obtained depth values. As above, the two-dimensional values for the plurality of pixels can be color values, and each depth value can indicate a distance from a physical object in the physical scene represented by the corresponding pixel to the sensing device. Optionally, the system can include logic that defines a maximum depth range, the maximum depth range indicating the farthest distance for which depth values will be obtained. In this aspect, logic can also be included that that detects depth values for a user only when the user is within a distance less than the maximum depth range to the sensing device.

A further method for providing a real-time three-dimensional interactive environment is disclosed in an additional embodiment of the present invention. As above, the method includes obtaining two-dimensional data values for a plurality of pixels representing a physical scene. Also as above, a depth value for each pixel of the plurality of pixels is obtained using a depth sensing device. Each depth value indicates a distance from a physical object in the physical scene to the depth sensing device. Based on the obtained two-dimensional data values and the obtained depth values, three-dimensional volume information is estimated for each physical object in the physical scene. In addition, computer-generated virtual objects having three-dimensional volume information for the virtual object can be inserted into the scene. In this manner, interactions between physical and virtual objects in the scene can be detected based on the coordinates of the three-dimensional volume information for the virtual object and the physical object. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which:

FIG. 2 is a flowchart showing a method for providing a real-time three-dimensional interactive environment, in accordance with an embodiment of the present invention;

DETAILED DESCRIPTION OF THE PREFERRED EMBODIMENTS

An invention is disclosed for providing a real-time three-dimensional interactive environment using a three-dimensional camera. Generally, embodiments of the present invention allow the user to interact with, and affect, computer objects and environments that are combined visually with the user's actual physical environment. Through the use of a three-dimensional camera, three-dimensional images can be obtained in real-time. These three-dimensional images are utilized to place digital objects within the user's environment, track the user's movement, and accurately detect when the user interacts with the digital objects. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

In the following description, the terms "depth camera" and "three-dimensional camera" will refer to any camera that is capable of obtaining distance or depth information as well as two-dimensional pixel information. For example, a depth camera can utilize controlled infrared lighting to obtain distance information. Another exemplary depth camera can be a stereo camera pair, which triangulates distance information using two standard cameras. Similarly, the term "depth sensing device" will refer to any type of device that is capable of obtaining distance information as well as two-dimensional pixel information.

Recent advances in three-dimensional imagery have opened the door for increased possibilities in real-time interactive computer animation. In particular, new "depth cameras" provide the ability to capture and map the third-dimension in addition to normal two-dimensional video imagery. With the new depth data, embodiments of the present invention allow the placement of computer-generated objects in various positions within a video scene in real-time, including behind other objects.

Moreover, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, users can experience an interactive game environment within their own living room.

Figure 1A:
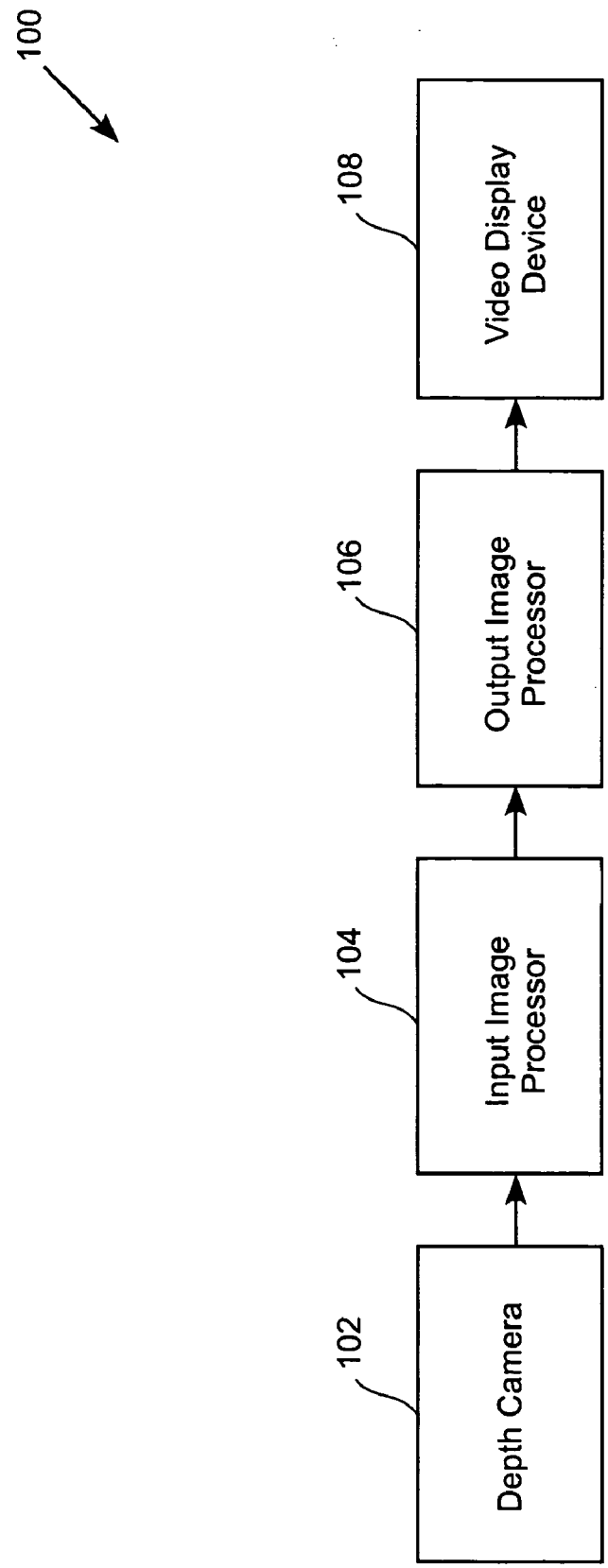
FIG. 1A is a block diagram of an exemplary system for providing a real-time three-dimensional interactive environment, in accordance with an embodiment of the present invention.

FIG. 1A is a block diagram of an exemplary system 100 for providing a real-time three-dimensional interactive environment, in accordance with an embodiment of the present invention. As shown in FIG. 1A, the system 100 includes a depth camera 102, an input image processor 104, an output image processor 106, and a video display device 108.

Figure 1B:
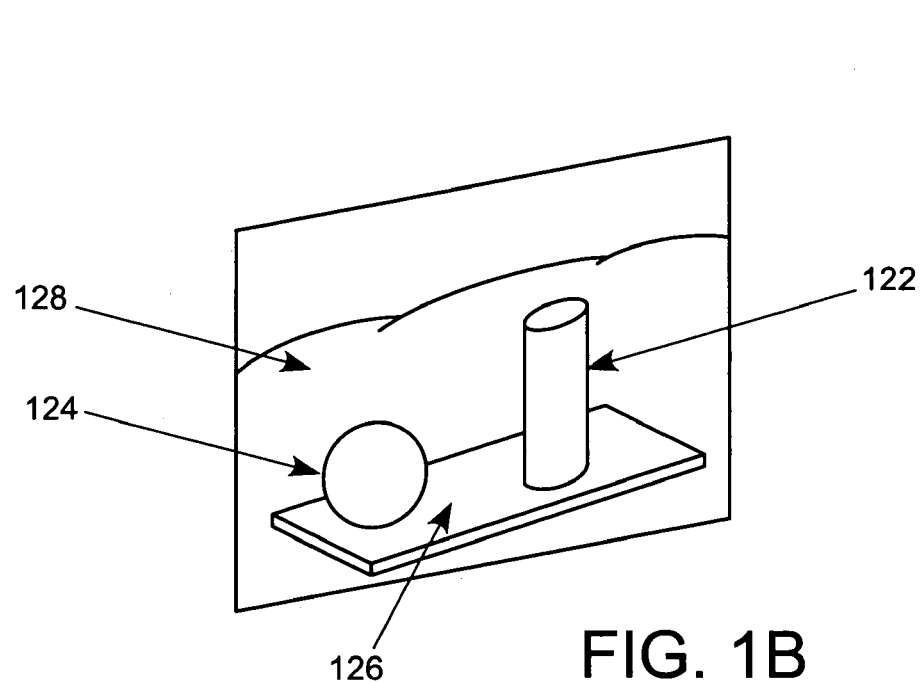
FIG. 1B is an illustration showing a two-dimensional data captured using a typical depth camera.
Figure 1C:
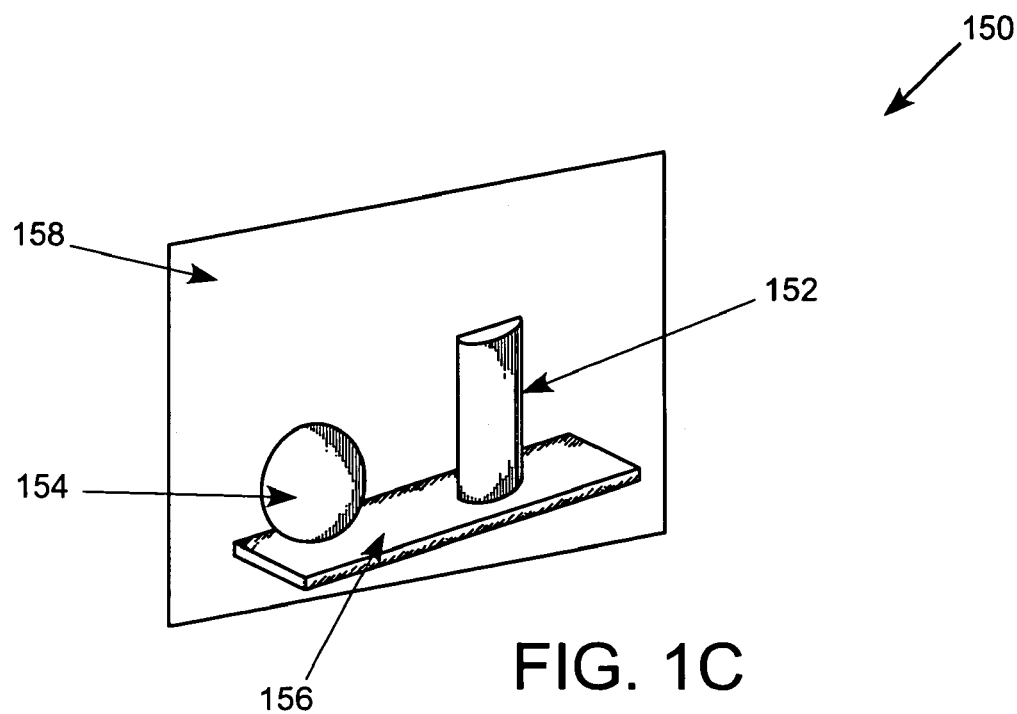
FIG. 1C is an illustration showing depth data captured using a typical depth camera.

As mentioned above, the depth camera 102 provides the ability to capture and map the third-dimension in addition to normal two-dimensional video imagery. FIGS. 1B and 1C illustrated the images generated by a typical depth camera 102. In particular, FIG. 1B is an illustration showing two-dimensional data 120 captured using a typical depth camera. Similar to normal cameras, a depth camera captures two-dimensional data for a plurality of pixels that comprise the video image. These values are color values for the pixels, generally red, green, and blue (RGB) values for each pixel. In this manner, objects captured by the camera appear as two-dimension objects on a monitor. For example, in FIG. 1B, the exemplary scene includes a cylinder object 122 and a sphere object 124 disposed on a table 126, which is situated among hills 128, illustrated in the background.

However, unlike a conventional camera, a depth camera also captures depth values for the scene. FIG. 1C is an illustration showing depth data 150 captured using a typical depth camera. As illustrated in FIG. 1B, the depth camera captures the x and y components of a scene using RGB values for each pixel in the scene. However, as shown in FIG. 1C, the depth camera also captures the z-components of the scene, which represent the depth values for the scene. Since the depth values correspond to the z-axis, the depth values are often referred to as z-values.

In operation, a z-value is captured for each pixel of the scene. Each z-value represents a distance from the camera to a particular object in the scene corresponding to the related pixel. For example, in FIG. 1C, z-values are illustrated for the cylinder object 152, the sphere object 154, and part of the table 156. In addition, a maximum detection range is defined beyond which depth values will not be detected. For example, in FIG. 1C the maximum depth range 158 appears as vertical plane wherein all pixels are given the same depth value. As will be described in greater detail below, this maximum range plane can be utilized by the embodiments of the present invention to provide user defined object tracking. Thus, using a depth camera, each object can be tracked in three dimensions. As a result, a computer system of the embodiments of the present invention can utilize the z-values, along with the two-dimensional pixel data, to create an enhanced three-dimensional interactive environment for the user.

Referring back to FIG. 1A, the input image processor 104 translates the captured video images and depth data into signals that are delivered to an output image processor. The output image processor 106 is programmed to effect movement and status of virtual objects on the video display device 108 in response to signals received from the input image processor 104.

These and additional aspects of the present invention may be implemented by one or more processors which execute software instructions. According to one embodiment of the present invention, a single processor executes both input image processing and output image processing. However, as shown in the figures and for ease of description, the processing operations are shown as being divided between an input image processor 104 and an output image processor 106. It should be noted that the invention is in no way to be interpreted as limited to any special processor configuration, such as more than one processor. The multiple processing blocks shown in FIG. 1A and the other Figures are shown only for convenience of description.

Figure 1D:
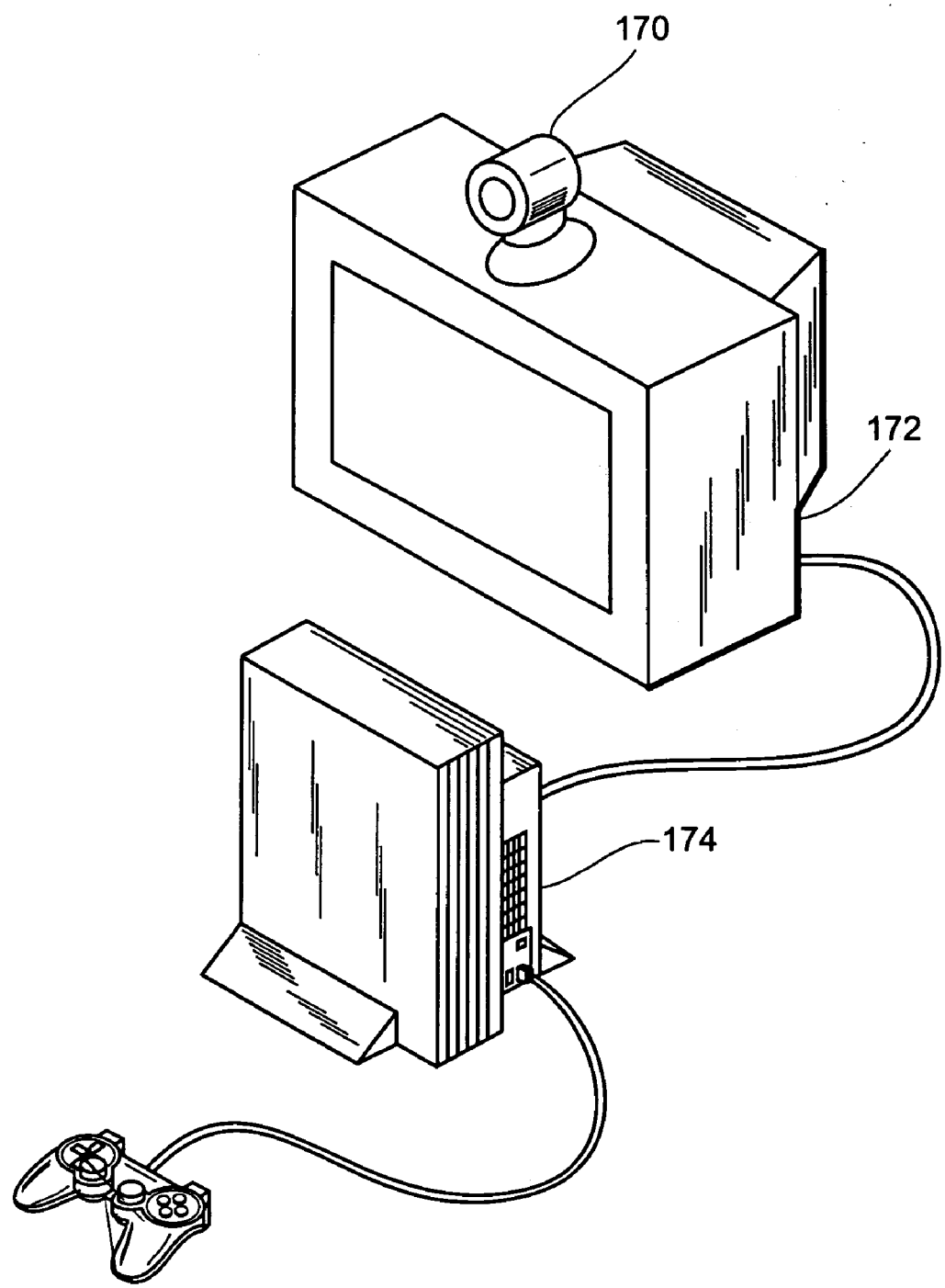
FIG. 1D illustrates an exemplary system environment for providing a real-time three-dimensional interactive environment, in accordance with an embodiment of the present invention.

FIG. 1D illustrates an exemplary system environment for providing a real-time three-dimensional interactive environment, in accordance with an embodiment of the present invention. The system environment includes, depth camera 170, video display device 172, and console 174 having processor functionality, such as a video game machine. Generally, a user and their environment, such as a living room, are located within the field of view of the depth camera 170. The processing system 174 can be implemented by an entertainment system, such as a Sony® Playstation™ II or Sony® Playstation™ I type of processing and computer entertainment system. It should be noted, however, that processing system 174 can be implemented in other types of computer systems, such as personal computers, workstations, laptop computers, wireless computing devices, or any other type of computing device that is capable of receiving and processing graphical image data.

FIG. 2 is a flowchart showing a method 200 for providing a real-time three-dimensional interactive environment, in accordance with an embodiment of the present invention. In an initial operation 202, preprocess operations are performed. Preprocess operations can include defining three-dimensional objects, adjusting a depth camera for optimum performance, and other preprocess operations that will be apparent to those skilled in the art after a careful reading of the present disclosure.

In operation 204, a maximum depth range is defined. As described above, a maximum depth range is defined beyond which depth values will not be detected. Typically, the maximum depth range appears as vertical plane wherein all pixels are given the same depth value. This maximum range plane can be utilized by the embodiments of the present invention to provide user defined object tracking, as illustrated in FIG. 3.

Figure 3:
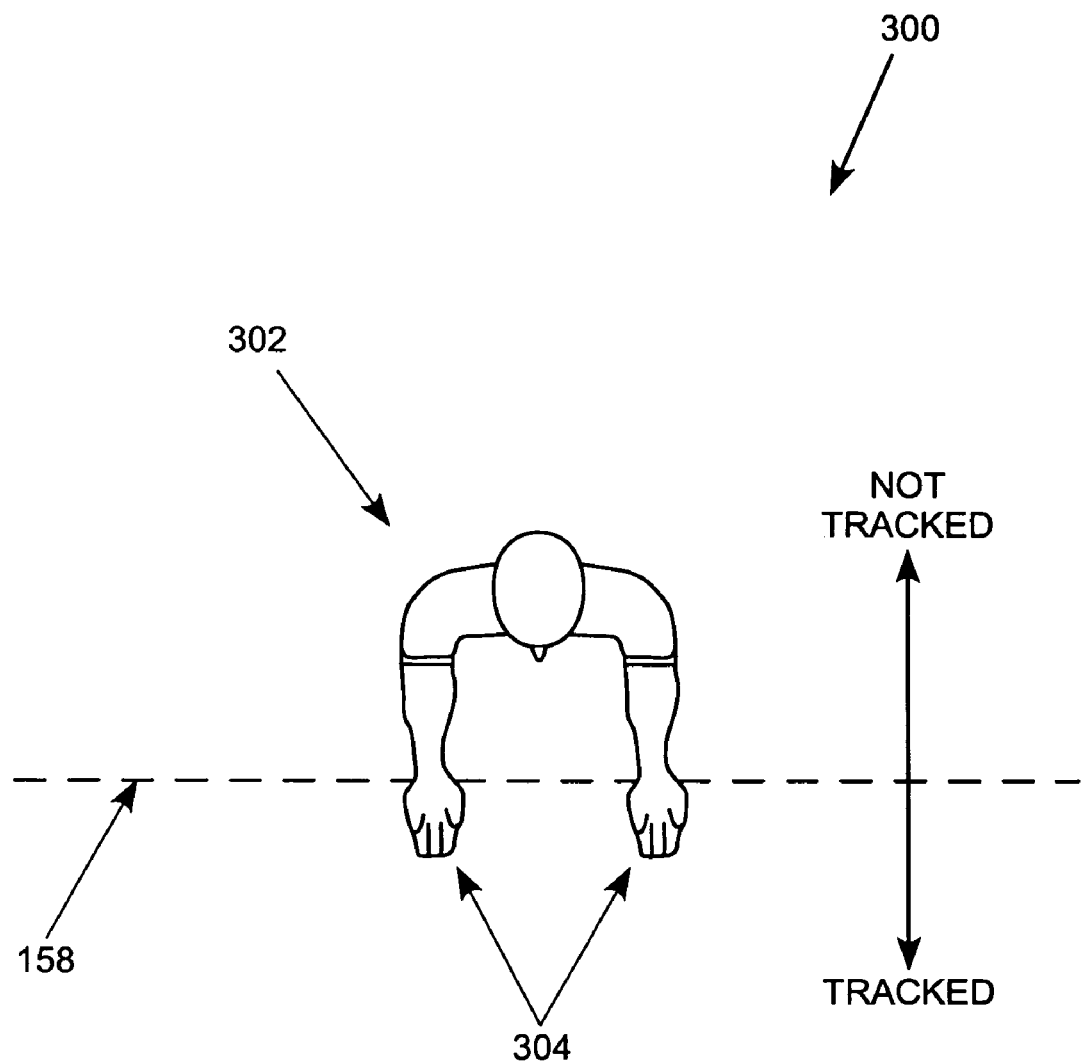
FIG. 3 is an illustration showing a top view of a user interacting with a maximum range plane, in accordance with an embodiment of the present invention.

FIG. 3 is an illustration showing a top view 300 of a user 302 interacting with a maximum depth range plane 158, in accordance with an embodiment of the present invention. As shown in FIG. 3, a maximum depth range plane 158, which defines tracking distance, is defined. Objects in front of the maximum depth range plane 158 are tracked, while objects behind the maximum depth range plane 158 are not tracked. In this manner, the user 302 can determine when to interact with the system by allowing part of the user's body, or an object, to cross the maximum depth range plane 158.

For example, when the user 302 of FIG. 3 places their hands 304 in front of the maximum depth range plane 158, the system detects and tracks their hands 304. In this manner, the user 302 controls when to interact with the system, and the system can avoid any confusing information caused, for example, by unexpected body movement. In addition, motion confusion caused by other people moving behind the user, or for example, a family pet, can be avoided.

For example, in one embodiment of the present invention, the user 302 is allowed to drag and drop objects on the screen by gesturing with their hands across the maximum depth range plane 158. In this embodiment, a user can extend their hand 304 or other object across the maximum depth range plane 158 to initiate interaction with objects on a screen. The movement of the user's hand is then tracked using the depth data provided by the depth camera. Tracking is then terminated when the user retracts their hand behind the maximum depth range plane 158. During tracking, objects encountered by the user's hand movement can be moved and manipulated, as described in greater detail subsequently.

Referring back to FIG. 2, two-dimensional data values are obtained for each pixel comprising the scene, in operation 206. As mentioned above, a depth camera can capture two-dimensional data for a plurality of pixels that comprise a video image. These values are color values for the pixels, and generally red, green, and blue (RGB) values for each pixel. In this manner, objects captured by the camera appear as two-dimension objects on a monitor.

Figure 4:
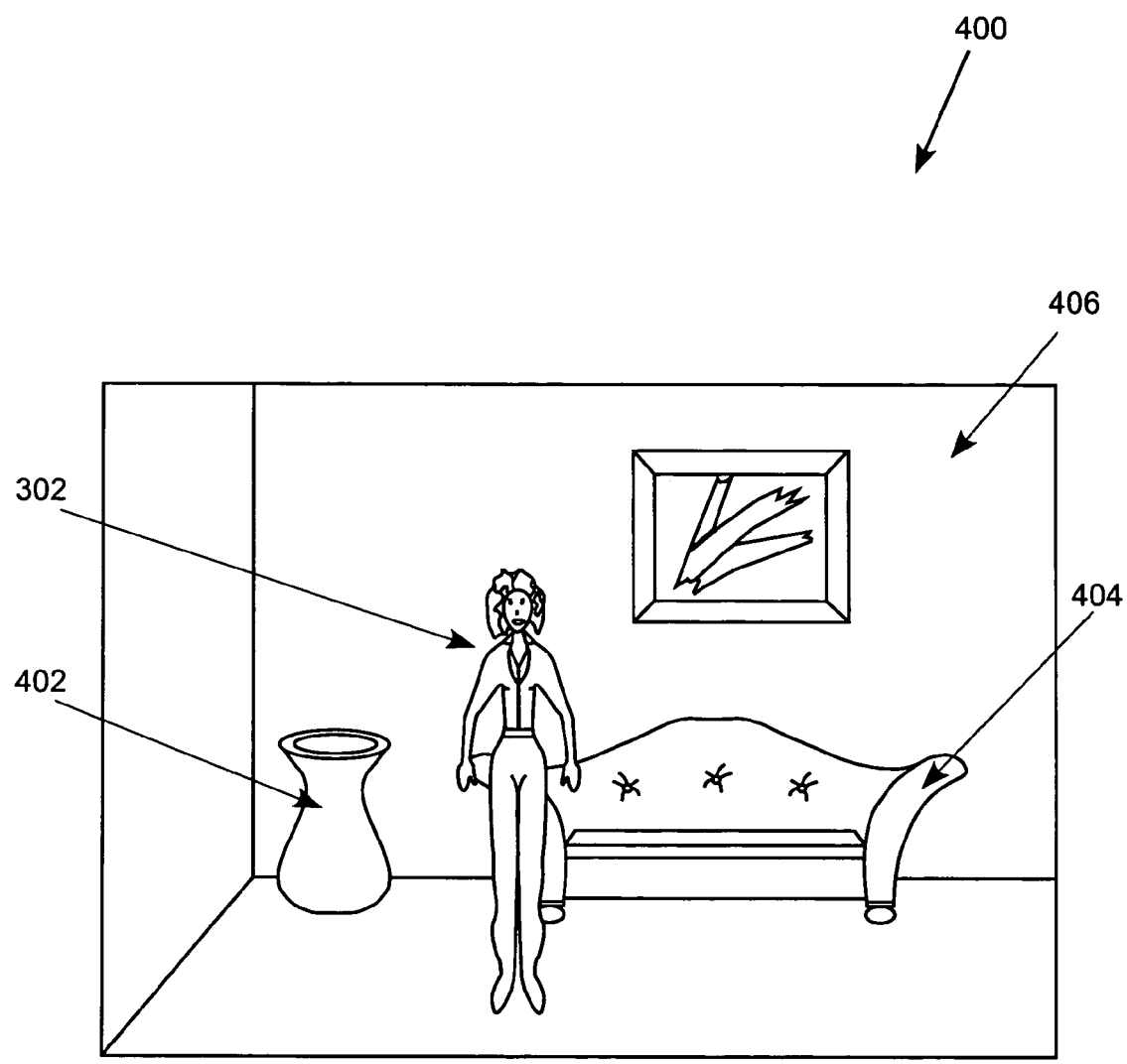
FIG. 4 is an illustration showing two-dimensional data for an exemplary scene, in accordance with an embodiment of the present invention.

For example, FIG. 4 is an illustration showing two-dimensional data 400 for an exemplary scene, in accordance with an embodiment of the present invention. The exemplary scene on FIG. 4 illustrates a user 302 in the living room of their home. However, it should be noted that embodiments of the present invention can be utilized in any location, as desired by the user. As can be appreciated, various physical objects are located in this environment. For example, in FIG. 4 there is a vase 402 and sofa 404, as well as a picture on the back wall 406 of the room. As will be discussed in greater detail subsequently these exemplary objects will illustrate properties of the embodiments of the present invention.

Generally, the user 302 positions the depth camera in a suitable position in front of them. In addition, various adjustments can be made to the camera angle, aperture setting, and other settings that will be apparent to those skilled in the art after a careful reading of the present disclosure. The camera then captures video data for the scene, generally comprising color values for the pixels comprising the scene.

Referring back to FIG. 2, depth values are obtained for each pixel comprising the scene, in operation 208. In addition to two-dimensional data capture, a depth camera also captures depth values for the scene. As discussed above, the depth camera captures the x and y components of a scene using RGB values for each pixel in the scene. However, the depth camera also captures the z-components of the scene, which represent the depth values for the scene.

Figure 5:
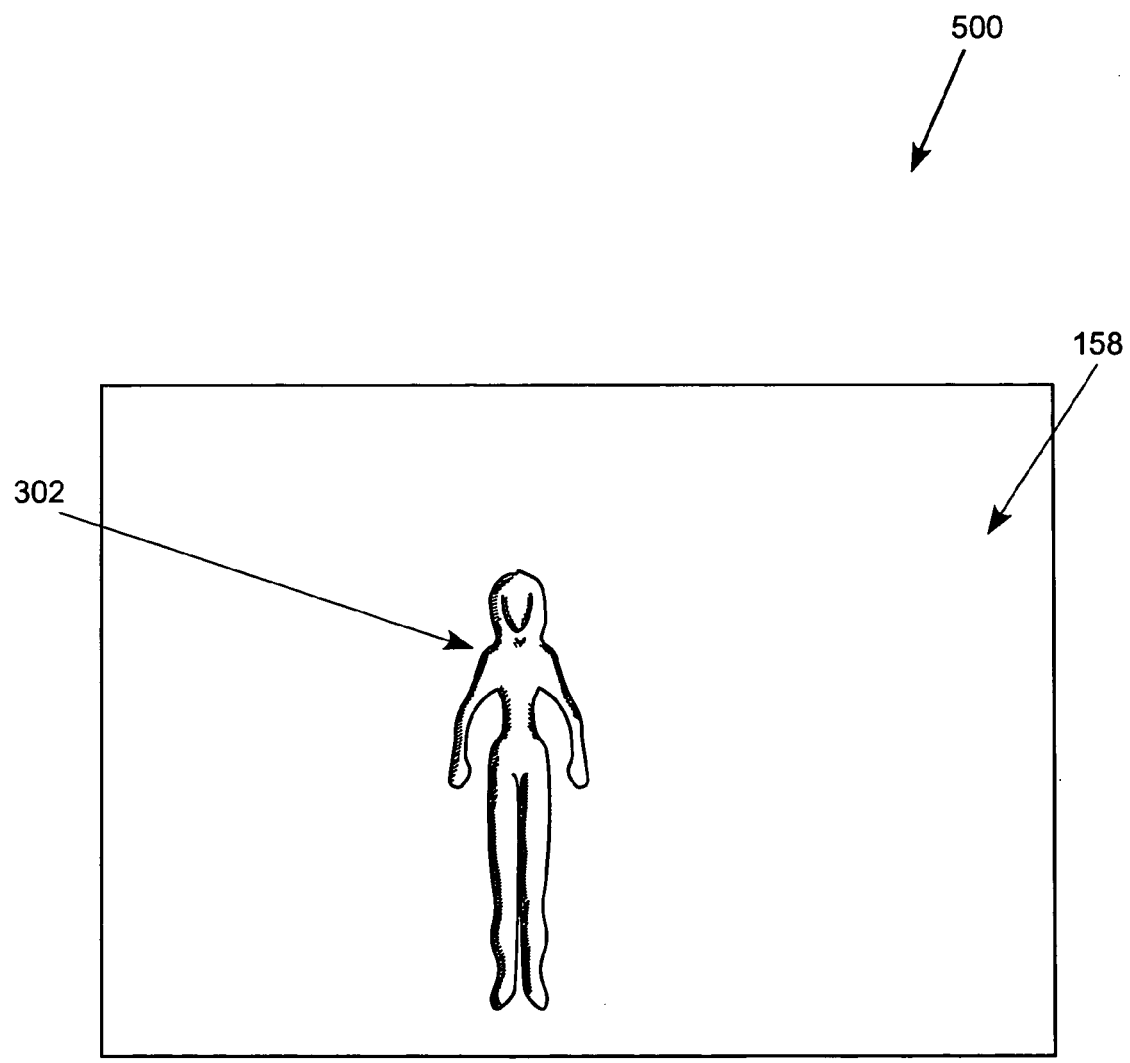
FIG. 5 illustrates z-values for the exemplary scene of FIG. 4, in accordance with an embodiment of the present invention.

Thus, in operation 208, a z-value is captured for each pixel of the scene. Each z-value represents a distance from the camera to a particular object in the scene corresponding to the related pixel. For example, FIG. 5 illustrates z-values for the exemplary scene of FIG. 4, in accordance with an embodiment of the present invention. The z-values are included for the user 302, however, in the example of FIG. 5 the maximum depth range plane 158 has been defined just behind the user 302. Thus, excluding depth values for the other objects in the scene, including the vase, sofa, and back wall. However, it should be noted that the maximum depth range plane 158 can be defined at any distance. Thus, the maximum depth range plane 158 can be defined farther back in the exemplary scene to include the vase, sofa, and back wall.

In this manner, the position and movement of the user 302 can be tracked. Moreover, using the depth information, the user 302 can be tracked in three dimensions, thus allowing for realistic placement of objects within the scene. Furthermore, using the three-dimensional data allows users to interact with a virtual environment in a realistic manner thus enhancing the user's 302 experience.

In addition, one embodiment of the present invention can construct complete 3D volume information for objects in the scene using the z-values. In general, a depth camera does not itself provide full volume information. That is, the depth camera provides z-values for pixels of object surfaces that are visible to the camera. Hence, the z-values for the surfaces, such as the user's 302 back are not provided by the depth camera. Thus, one embodiment of the present invention estimates the complete volume information for objects in the scene to create complete 3D volumes, which can later be intersected with other 3D objects to determine collisions or for measuring distances between the objects.

For example, in FIG. 5, one embodiment of the present invention estimates the "back" z-values of the user 302, which are not visible to the depth camera. In one embodiment, a pre-generated model is utilized to estimate the volume of a particular object. Although the pre-generated model may not be absolutely accurate, and good estimation of volume can be achieved. For example, when estimating a volume of a particular person, the depth of the person can be estimated to be equal to the width of the person. When the model is accurate, embodiments of the present invention orient the model to match the orientation the actual object, and then utilize the model to estimate the volume of the object. For example, when the object is a couch, embodiments of the present invention orient a model couch to match the couch object, then determine the volume of the couch object based on the couch size and the model data.

In this manner, a complete 3D volume of the user 302 can be constructed, which can later be utilized to interact with computer generated virtual objects. In this manner, embodiments of the present invention can process both real and virtual objects in a single consistent manner.

Referring back to FIG. 2, in operation 210, virtual objects are inserted into the scene. With the new depth data obtained in operation 208, embodiments of the present invention allow the placement of computer-generated objects in various positions within a video scene in real-time, including behind other objects in operation 210.

In this manner, embodiments of the present invention provide real-time interactive gaming experiences for users. For example, users can interact with various computer-generated objects in real-time. Furthermore, video scenes can be altered in real-time to enhance the user's game experience. For example, computer generated costumes can be inserted over the user's clothing, and computer generated light sources can be utilized to project virtual shadows within a video scene. Hence, using the embodiments of the present invention and a depth camera, user's can experience an interactive game environment within their own living room.

Figure 6:
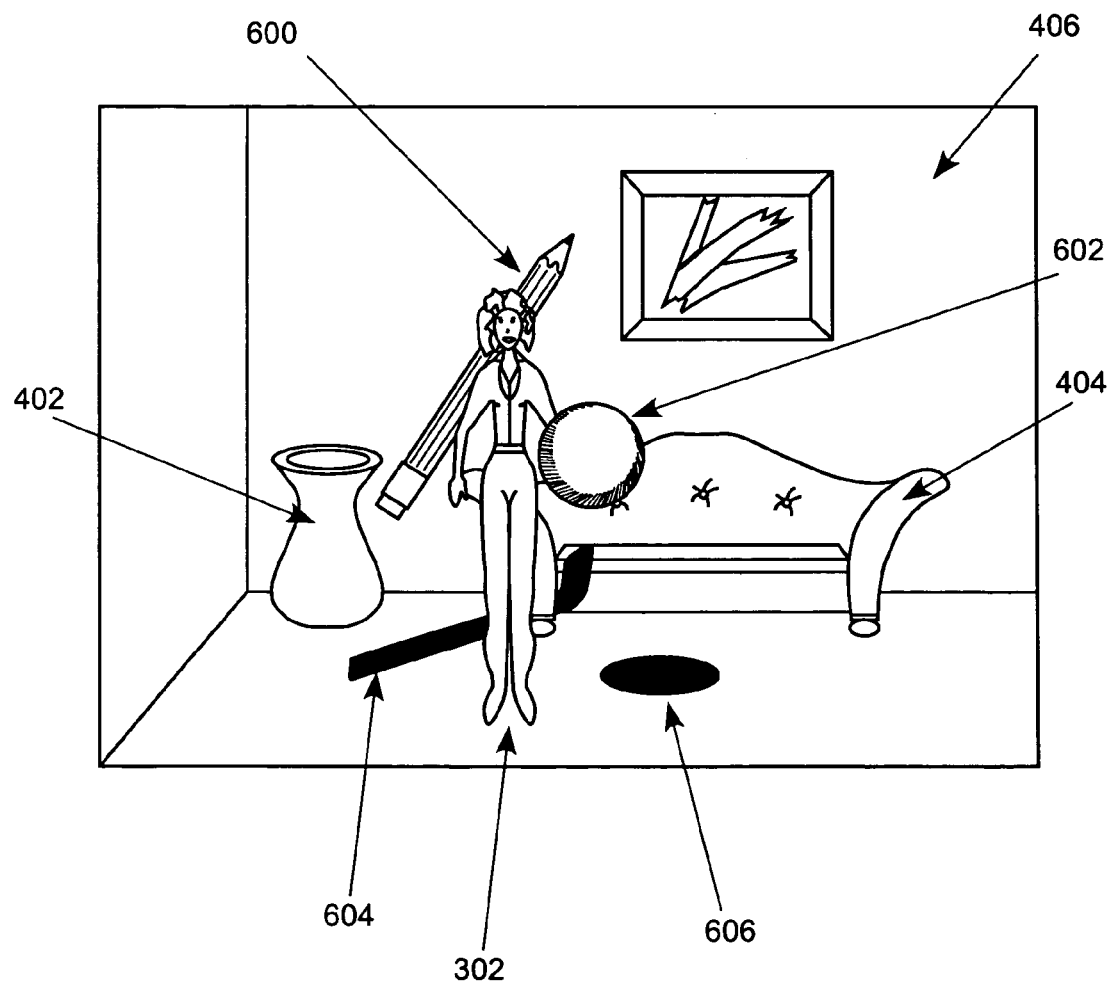
FIG. 6 is an illustration showing computer generated virtual objects inserted into a scene, in accordance with an embodiment of the present invention.

For example, FIG. 6 is an illustration showing computer-generated virtual objects inserted into a scene, in accordance with an embodiment of the present invention. As in FIG. 4, the scene includes a vase 402 and sofa 404, as well as a picture on the back wall 406 of the room. The depth camera captures these physical objects using two-dimensional pixel data, as described previously. In addition, also described above, the depth camera captures depth data, in this example for the user 302. Using the depth data, embodiments of the preset invention insert virtual objects into the scene. For example, in FIG. 6 two virtual objects 600 and 602 were added to the scene. As illustrated, the virtual objects 600 and 602 can be inserted into the scene in a realistic manner because of the added depth information available.

That is, the depth data obtained in operation 208 can be utilized to determine the exact position of the user 302 in three-dimensional space. As a result, the virtual "pencil" object 600 can be positioned, altered, and animated to appear to be "behind" the user 302. Similarly, the virtual sphere 602 can be positioned, altered, and animated to appear, for example, in "front" of the user 302. Moreover, by extending the maximum depth range to approximately the position of the back wall 406, the inserted virtual objects can appear to interact with other objects in the user's room. In addition, one embodiment of the present invention inserts a virtual light source in the scene to cast "shadows" 604 and 606 from the virtual objects, which further increase the realism of the virtual scene. Since, the exact three-dimensional position of the floor and sofa 404 can be determined from the depth data, the computer-generated shadow 606 of the virtual sphere 602 can appear to be cast on the floor and the computer-generated shadow 604 of the virtual pencil 602 can appear to be cast on the sofa 404 and on the floor. Virtual objects can also include computer-generated changes to the physical objects within the room, as illustrated in FIG. 7.

Figure 7:
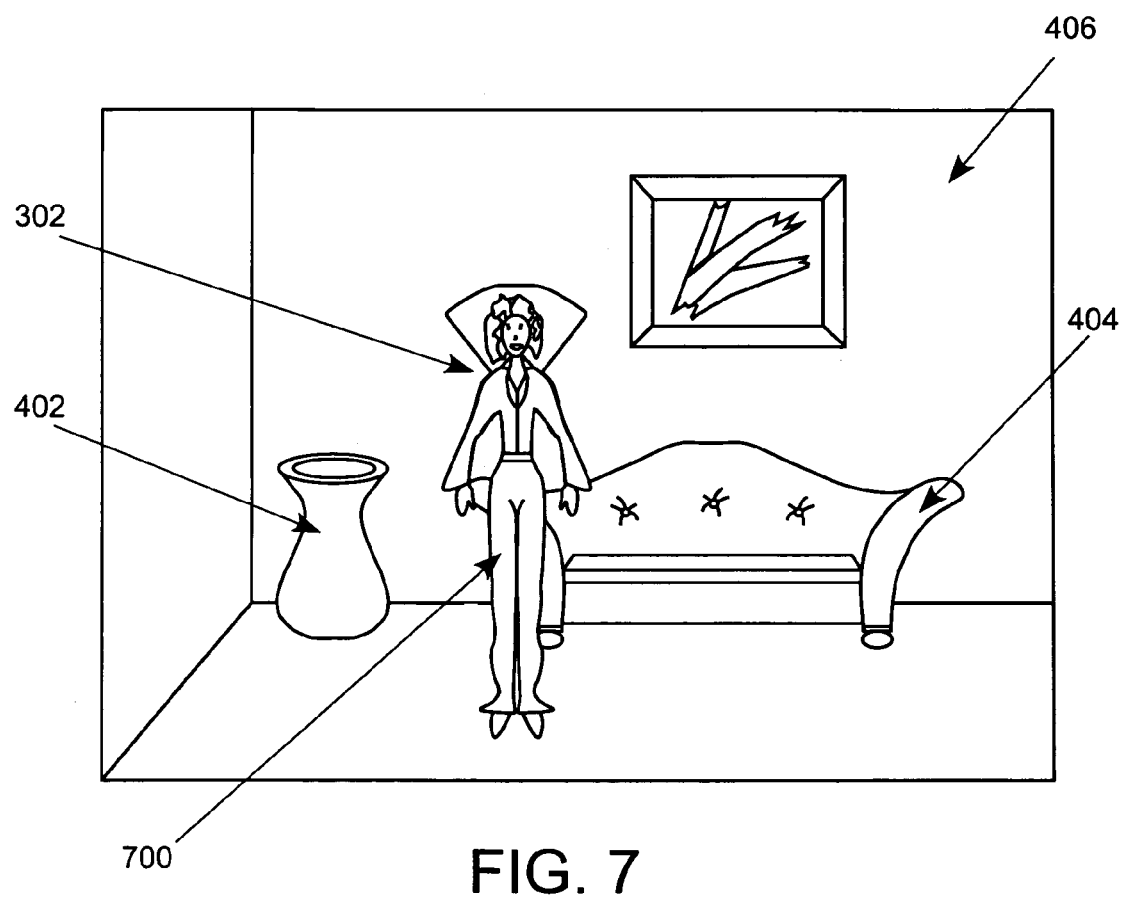
FIG. 7 is an illustration showing computer-generated changes to the physical objects within the room, in accordance with an embodiment of the present invention.

FIG. 7 is an illustration showing computer-generated changes to the physical objects within the room, in accordance with an embodiment of the present invention. As in FIG. 4, the scene includes a vase 402 and sofa 404, as well as a picture on the back wall 406 of the room. The depth camera captures these physical objects using two-dimensional pixel data, as described previously. In addition, also described above, the depth camera captures depth data, in this example for the user 302. Using the depth data, embodiments of the preset invention can visually alter physical objects in the scene. For example, in FIG. 7, a computer-generated costume 700 has been inserted into the scene over the user's clothing. Since the z-values obtained from the depth camera allow the system to track the user's movement, the computer-generated costume 700 can be animated to move with the user, creating the appearance that the user 302 is "wearing" the computer-generated costume.

Referring back to FIG. 2, the user's interactions with the virtual objects are detected based on the obtained two-dimensional data and the depth values. As is well known in the art, computer-generated three-dimensional objects are located in a virtual three-dimensional space and processed, often using matrices, to generate a two-dimensional projection of the three-dimensional scene, typically viewed using a monitor or television. In one embodiment of the present invention, the virtual three-dimensional space is configured to coincide with the physical space of the user. For example, referring to FIG. 6, the virtual three-dimensional space can be configured to coincide with the living room of the user 302. In this manner, embodiments of the present invention can detect when objects, both virtual and physical, occupy the same three-dimensional space.

Thus, embodiments of the present invention can, utilizing the z-values from the depth camera, allow the user 302 to interact with the virtual objects. For example, a user can swing at the virtual sphere 602 and the system can detect when the user's 302 hand, for example, occupies the same space as the virtual sphere 602, indicating a collision. Thereafter, an appropriate response to the collision can be generated, for example, the virtual sphere 602 can be made the "virtually fly" across the room.

Post process operations are performed in operation 214. Post process operations can include saving locations of virtual objects on a computer storage medium, loading of saved virtual objects from the computer storage medium, and other post process operation that will be apparent to those skilled in the art after a careful reading of the present disclosure.

Figure 8:
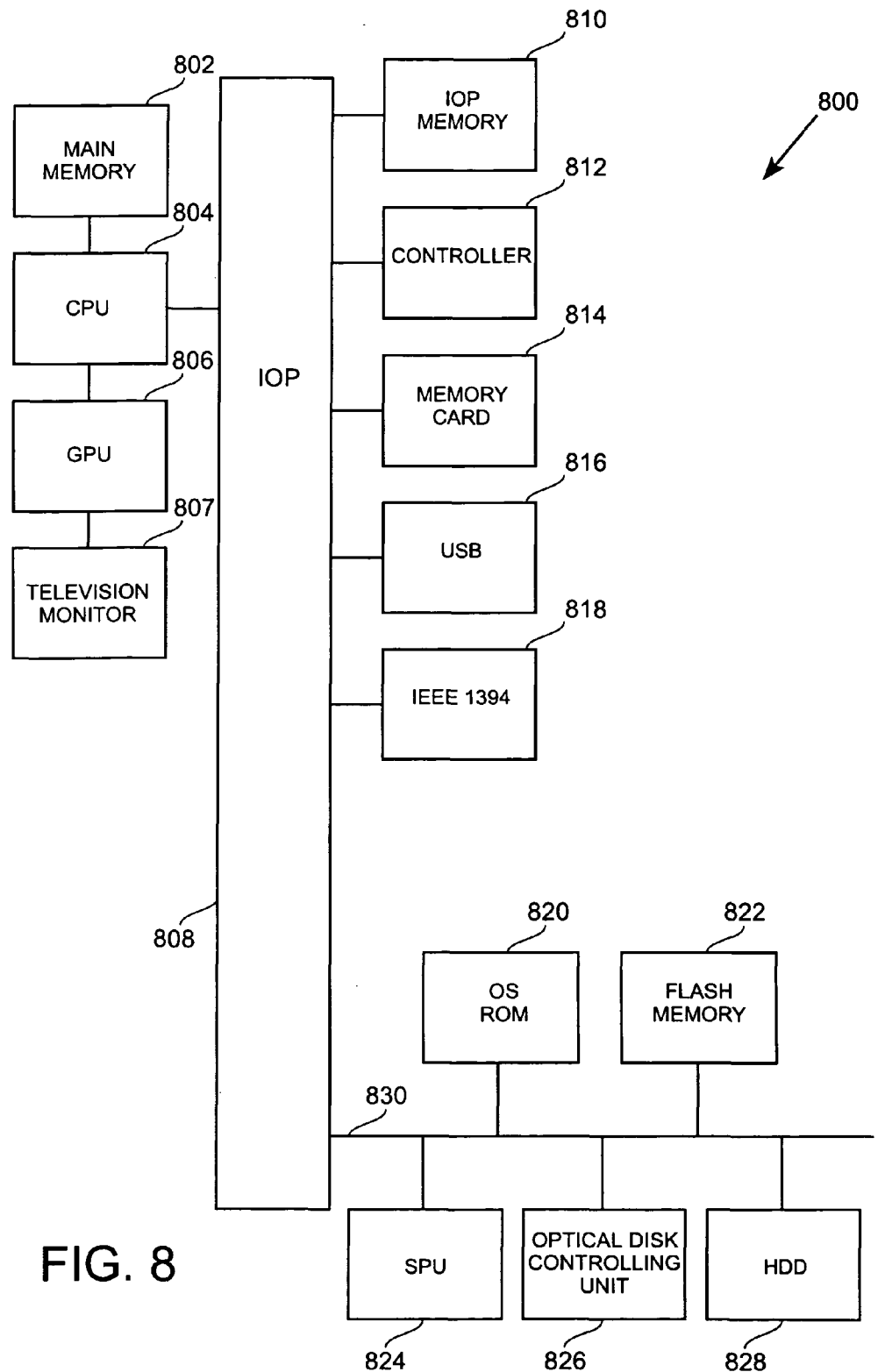
FIG. 8 is a block diagram of a computer processing system for providing a three-dimensional interactive environment, in accordance with an embodiment of the present invention.

In one embodiment, the three-dimensional interactive system and methods of the embodiments of the present invention are implemented using a computer processing system illustrated by the block diagram of FIG. 8. The processing system may represent a computer-based entertainment system embodiment that includes a central processing unit ("CPU") 804 coupled to a main memory 802 and graphical processing unit ("GPU") 806. The CPU 804 is also coupled to an Input/Output Processor ("IOP") Bus 808. In one embodiment, the GPU 806 includes an internal buffer for fast processing of pixel based graphical data. Additionally, the GPU can include an output processing portion or functionality to convert the image data processed into standard television signals, for example NTSC or PAL, for transmission to a television monitor 807 connected external to the entertainment system 800 or elements thereof. Alternatively, data output signals can be provided to a display device other than a television monitor, such as a computer monitor, LCD (Liquid Crystal Display) device, or other type of display device.

The IOP bus 808 couples the CPU 804 to various input/output devices and other busses or device. IOP bus 808 is connected to input/output processor memory 810, a controller 812, a memory card 814, a Universal Serial Bus (USB) port 816, an IEEE1394 (also known as a Firewire interface) port, and bus 830. Bus 830 couples several other system components to CPU 804, including operating system ("OS") ROM 820, flash memory 822, a sound processing unit ("SPU") 824, an optical disc controlling unit 826, and a hard disk drive ("HDD") 828. In one aspect of this embodiment, the video capture device can be directly connected to the IOP bus 808 for transmission therethrough to the CPU 804; there, data from the video capture device can be used to change or update the values used to generate the graphics images in the GPU 806.

Programs or computer instructions embodying aspects of the present invention can be provided by several different methods. For example, the user input method for interaction with graphical images can be provided in the form of a program stored in HDD 828, flash memory 822, OS ROM 820, or on a memory card 812. Alternatively, the program can be downloaded to the processing unit 800 through one or more input ports coupled to the CPU 804. The program modules defining the input method can be provided with the game or application program that is executed by the CPU 804 and displayed on display device 807 or they may be provided separately from the application program, such as for execution from local main memory 802.

Embodiments of the present invention also contemplate distributed image processing configurations. For example, the invention is not limited to the captured image and display image processing taking place in one or even two locations, such as in the CPU or in the CPU and one other element. For example, the input image processing can just as readily take place in an associated CPU, processor or device that can perform processing; essentially all of image processing can be distributed throughout the interconnected system. Thus, the present invention is not limited to any specific image processing hardware circuitry and/or software; it is also not limited to any specific combination of general hardware circuitry and/or software, nor to any particular source for the instructions executed by processing components.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer implemented method having access to memory, the method providing a real-time three-dimensional interactive environment, comprising the operations of:

obtaining two-dimensional data values for a plurality of pixels representing a physical scene, the plurality of pixels being of a captured image;

obtaining a depth value for each pixel of the plurality of pixels using a depth sensing device, each depth value indicating a distance from a physical object in the physical scene to the depth sensing device, the depth sensing device configurable to be maintained at a particular depth range defined by a plane so that any of the plurality of pixels between the particular depth range and the depth sensing device are processed by the depth sensing device, wherein the particular depth range establishes active detection by the depth sensing device, as depth values of objects placed through the particular depth range and toward the depth sensing device are detected and depth values of objects placed beyond the particular depth range are not detected, and the objects placed through the particular depth range are rendered and displayed in a virtual scene based on geometric characteristics of the object itself;

initiating tracking of the objects when the objects are placed through the particular depth range and toward the depth sensing device, and terminating tracking of the objects when the objects are placed beyond the particular depth range;

inserting at least one virtual object into the virtual scene after obtaining the depth value for each pixel within the particular depth range, the virtual object being computer-generated and configured to be inserted within and beyond the particular depth range;

detecting an interaction between only objects placed through the particular depth range and the virtual object based on coordinates of the virtual object and the obtained depth values of the objects placed through the particular depth range, wherein the interaction is a collision between a physical object in the scene and the virtual object or interaction with the virtual object; and detecting when the virtual object and a physical object occupy a same three-dimensional space based on three-dimensional coordinates of the virtual object and three-dimensional coordinates of the physical object.

2. A method as recited in claim 1, wherein the two-dimensional values for the plurality of pixels are color values.

3. A method as recited in claim 1, wherein each depth value indicates a distance from a physical object in the physical scene represented by the corresponding pixel to the sensing device.

4. A method as recited in claim 1, further comprising the operation of visually altering an appearance of a physical object in the scene.

5. A method as recited in claim 4, wherein the physical object is a user.

6. A method as recited in claim 5, wherein computer-generated clothing is mapped to the user based on the depth values for pixels representing the user.

7. A method as recited in claim 1, wherein the physical object is a user.

8. A method as recited in claim 7, further comprising the operation detecting depth values for the user only when the user is within a distance less than a maximum depth range to the sensing device, the maximum depth range being the set particular depth range.

9. A method as recited in claim 1, wherein the depth sensing device is a depth camera using controlled infrared lighting.

10. A method as recited in claim 1, wherein pixels corresponding to objects beyond the particular depth range are assigned a same depth value.

11. A non-transitory computer program embodied on a computer readable medium for providing a real-time three-dimensional interactive environment, comprising:

program instructions that obtain two-dimensional data values for a plurality of pixels representing a physical scene, the plurality of pixels being of a captured image;

program instructions that obtain a depth value for each pixel of the plurality of pixels using a depth sensing device, each depth value indicating a distance from a physical object in the physical scene to the depth sensing device, the depth sensing device configured to be set for a particular depth range so that only selected ones of the plurality of pixels within the particular depth range are processed by the depth sensing device, wherein the particular depth range establishes active detection by the depth sensing device as depth values of objects placed through the particular depth range and toward the depth sensing device are detected and depth values of objects beyond the particular depth range are not detected, and the objects placed through the particular depth range are rendered and displayed in a virtual scene based on geometric characteristics of the object itself;

program instructions that initiate tracking of the objects when the objects are placed through the particular depth range and toward the depth sensing device, and terminate tracking of the objects when the objects are placed beyond the particular depth range;

program instructions that insert at least one virtual object into the virtual scene, the virtual object being computer-generated and configured to be inserted within and beyond the particular depth range; and program instructions that detect an interaction between a physical object in the physical scene and the virtual object based on coordinates of the virtual object and the obtained depth values, such that only the physical object and the physical scene within the particular depth range are identified for processing the detection of the interaction, wherein the interaction is a collision between the physical object in the scene and the virtual object or interaction with the virtual object; and program instructions that detect when the virtual object and a physical object occupy a same three-dimensional space based on three-dimensional coordinates of the virtual object and three-dimensional coordinates of the physical object.

12. A computer program as recited in claim 11, wherein the two-dimensional values for the plurality of pixels are color values.

13. A computer program as recited in claim 11, wherein each depth value indicates a distance from the physical object in the physical scene represented by the corresponding pixel to the sensing device.

14. A computer program as recited in claim 11, further comprising program instructions that define a maximum depth range, the maximum depth range being the particular depth range that indicates the farthest distance for which depth values will be obtained.

15. A computer program as recited in claim 11, further comprising program instructions that assign a same depth value to pixels corresponding to objects beyond the particular depth range.

16. A system for providing a real-time three-dimensional interactive environment, comprising:

a depth sensing device capable of obtaining two-dimensional data values for a plurality of pixels representing a physical scene, wherein the depth sensing device is further capable of obtaining a depth value for each pixel of the plurality of pixels, each depth value indicating a distance from a physical object in the physical scene to the depth sensing device, the depth sensing device configured to be set for a particular depth range so that only selected ones of the plurality of pixels within the particular depth range are processed by the depth sensing device, and the plurality of pixels being of a captured image, wherein the particular depth range establishes active detection by the depth sensing device as depth values of objects placed through the particular depth range and toward the depth sensing device are detected and depth values of objects beyond the particular depth range are not detected, and the objects placed through the particular depth range are rendered and displayed in a virtual scene based on geometric characteristics of the object itself;

logic that initiates tracking of the objects when the objects are placed through the particular depth range and toward the depth sensing device, and terminates tracking of the objects when the objects are placed beyond the particular depth range;

logic that inserts at least one virtual object into the virtual scene, the virtual object being computer-generated and configured to be inserted within and beyond the particular depth range; and logic that detects an interaction between a physical object in the physical scene and the virtual object based on coordinates of the virtual object and the obtained depth values, such that only the physical object and the physical scene within the particular depth range are identified for processing the detection of the interaction, wherein the interaction is a collision between the physical object in the scene and the virtual object or interaction with the virtual object; and logic that detects when the virtual object and a physical object occupy a same three-dimensional space based on three-dimensional coordinates of the virtual object and three-dimensional coordinates of the physical object.

17. A system as recited in claim 16, wherein the two-dimensional values for the plurality of pixels are color values, and wherein each depth value indicates a distance from a physical object in the physical scene represented by the corresponding pixel to the sensing device.

18. A system as recited in claim 16, further comprising logic that defines a maximum depth range, the maximum depth range being the particular depth range that indicates the farthest distance for which depth values will be obtained.

19. A system as recited in claim 18, further comprising logic that detects depth values for a user only when the user is within a distance less than the maximum depth range to the sensing device.

20. A system as recited in claim 16, further comprising logic that assigns a same depth value to pixels corresponding to objects beyond the particular depth range.

21. A computer implemented method having access to memory, the method providing a real-time three-dimensional interactive environment, comprising the operations of:

obtaining two-dimensional data values for a plurality of pixels representing a physical scene, the plurality of pixels being of a captured image;

obtaining a depth value for each pixel of the plurality of pixels using a depth sensing device, each depth value indicating a distance from a physical object in the physical scene to the depth sensing device, the depth sensing device configured to be set for a particular depth range so that only selected ones of the plurality of pixels within the particular depth range are processed by the depth sensing device, wherein the particular depth range establishes active detection by the depth sensing device as depth values of objects placed through the particular depth range and toward the depth sensing device are detected and depth values of objects beyond the particular depth range are not detected, and the objects placed through the particular depth range are rendered and displayed in a virtual scene based on geometric characteristics of the object itself;

initiating tracking of the objects when the objects are placed through the particular depth range and toward the depth sensing device, and terminating tracking of the objects when the objects are placed beyond the particular depth range;

estimating three-dimensional volume information for each physical object in the physical scene based on the obtained two-dimensional data values and the obtained depth values; and inserting at least one virtual object into the virtual scene, the virtual object being computer-generated and configured to be inserted within and beyond the particular depth range, wherein the virtual object includes three-dimensional volume information for the virtual object, wherein the interaction is a collision between the physical object in the scene and the virtual object or interaction with the virtual object.

22. A method as recited in claim 21, further comprising the operation of detecting an interaction between a physical object in the scene and the virtual object based on coordinates of the three-dimensional volume information for the virtual object and the three-dimensional volume information for the physical object, such that only the physical object and the physical scene within the particular depth range are identified for processing the detection of the interaction.

23. A method as recited in claim 21, wherein the two-dimensional values for the plurality of pixels are color values.

24. A method as recited in claim 21, wherein each depth value indicates a distance from a physical object in the physical scene represented by the corresponding pixel to the sensing device.

25. A method as recited in claim 21, wherein the particular depth range defines a maximum depth range that indicates the farthest distance for which depth values will be obtained.

26. A method as recited in claim 21, wherein pixels corresponding to objects beyond the particular depth range are assigned a same depth value.

27. A computer program embodied on a non-transitory computer readable medium for providing a real-time three-dimensional interactive environment, comprising:

program instructions that obtain two-dimensional data values for a plurality of pixels representing a physical scene, the plurality of pixels being of a captured image;

program instructions that obtain a depth value for each pixel of the plurality of pixels using a depth sensing device, each depth value indicating a distance from a physical object in the physical scene to the depth sensing device, the depth sensing device configured to be set for a particular depth range so that only selected ones of the plurality of pixels within the particular depth range are processed by the depth sensing device, wherein the particular depth range establishes active detection by the depth sensing device as depth values of objects placed through the particular depth range and toward the depth sensing device are detected and depth values of objects beyond the particular depth range are not detected, and the objects placed within the particular depth range are rendered and displayed in a virtual scene based on geometric characteristics of the object itself;

program instructions that initiate tracking of the objects when the objects are placed through the particular depth range and toward the depth sensing device, and terminate tracking of the objects when the objects are placed beyond the particular depth range;

program instructions that estimate three-dimensional volume information for each physical object in the physical scene based on the obtained two-dimensional data values and the obtained depth values; and program instructions that insert at least one virtual object into the virtual scene, the virtual object being computer-generated and configured to be inserted within and beyond the particular depth range, wherein the virtual object includes three-dimensional volume information for the virtual object, wherein interaction is a collision between the physical object in the scene and the virtual object or interaction with the virtual object.

28. A computer program as recited in claim 27, further comprising program instructions that insert at least one virtual object into the scene, the virtual object being computer-generated, wherein the virtual object includes three-dimensional volume information for the virtual object.

29. A computer program as recited in claim 27, further comprising program instructions that detect an interaction between a physical object in the scene and the virtual object based on coordinates of the three-dimensional volume information for the virtual object and the three-dimensional volume information for the physical object, such that only the physical object and the physical scene within the particular depth range are identified for processing the detection of the interaction.

30. A computer program as recited in claim 27, wherein the two-dimensional values for the plurality of pixels are color values.

31. A computer program as recited in claim 27, wherein each depth value indicates a distance from a physical object in the physical scene represented by the corresponding pixel to the sensing device.

32. A computer program as recited in claim 27, further comprising program instructions that define a maximum depth range, the maximum depth range being the particular depth range that indicates the farthest distance for which depth values will be obtained.

33. A computer program as recited in claim 27, further comprising program instructions that assign a same depth value to pixels corresponding to objects beyond the particular depth range.

* * * * *